(12) United States Patent
Dhanuka et al.

(10) Patent No.: US 9,784,182 B2
(45) Date of Patent: Oct. 10, 2017

(54) POWER GENERATION AND METHANE RECOVERY FROM METHANE HYDRATES

(71) Applicants: Sulabh K. Dhanuka, Houston, TX (US); Michael W. Eaton, Denver, CO (US); Richard A. Huntington, Houston, TX (US)

(72) Inventors: Sulabh K. Dhanuka, Houston, TX (US); Michael W. Eaton, Denver, CO (US); Richard A. Huntington, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 482 days.

(21) Appl. No.: 14/188,550

(22) Filed: Feb. 24, 2014

(65) Prior Publication Data
US 2015/0240715 A1  Aug. 27, 2015
US 2017/0254263 A9  Sep. 7, 2017

(51) Int. Cl.
*F02C 3/22* (2006.01)
*F01K 23/10* (2006.01)
(Continued)

(52) U.S. Cl.
CPC ............... *F02C 3/22* (2013.01); *C10L 3/06* (2013.01); *C10L 3/107* (2013.01); *F01K 23/10* (2013.01); *F02C 3/34* (2013.01); *F02C 6/08* (2013.01); *F02C 6/18* (2013.01); *C10L 2290/02* (2013.01); *C10L 2290/06* (2013.01); *C10L 2290/10* (2013.01); *C10L 2290/14* (2013.01);
(Continued)

(58) Field of Classification Search
CPC ...... F02C 3/22; F02C 6/18; C10L 3/10; F01K 23/10; F01K 7/00; Y02E 20/16; Y02E 20/36
See application file for complete search history.

(56) References Cited

U.S. PATENT DOCUMENTS 2,488,911 A  11/1949 Hepburn et al.
2,884,758 A  5/1959 Oberle
(Continued)

FOREIGN PATENT DOCUMENTS

CA  2231749  9/1998
CA  2645450  9/2007
(Continued)

OTHER PUBLICATIONS

U.S. Appl. No. 14/173,683, filed Feb. 5, 2014, Veerappan, Muthaiah et al.
(Continued)

*Primary Examiner* — Brian D Nash
(74) *Attorney, Agent, or Firm* — ExxonMobil Upstream Research Company Law Department

(57) ABSTRACT

The present techniques are directed to a system and method for generating power and recovering methane from methane hydrates. The system includes a low emissions power plant configured to generate power, wherein an exhaust gas from the low emissions power plant provides a gas mixture including nitrogen and carbon dioxide. The system also includes a methane recovery system configured to recover methane from methane hydrates by injecting the nitrogen and the carbon dioxide from the gas mixture into the methane hydrates.

23 Claims, 8 Drawing Sheets

(51) Int. Cl.
*C10L 3/06* (2006.01)
*F02C 3/34* (2006.01)
*F02C 6/08* (2006.01)
*F02C 6/18* (2006.01)
*C10L 3/10* (2006.01)
*E21B 43/01* (2006.01)

(52) U.S. Cl.
CPC ....... C10L 2290/46 (2013.01); C10L 2290/48 (2013.01); E21B 2043/0115 (2013.01); F05D 2260/61 (2013.01); F05D 2260/611 (2013.01); Y02E 20/16 (2013.01)

(56) References Cited

U.S. PATENT DOCUMENTS

| | | |
|---|---|---|
| 3,631,672 A | 1/1972 | Gentile et al. |
| 3,643,430 A | 2/1972 | Emory et al. |
| 3,705,492 A | 12/1972 | Vickers |
| 3,841,382 A | 10/1974 | Gravis, III et al. |
| 3,949,548 A | 4/1976 | Lockwood, Jr. |
| 4,018,046 A | 4/1977 | Hurley |
| 4,043,395 A | 8/1977 | Every et al. |
| 4,050,239 A | 9/1977 | Kappler et al. |
| 4,066,214 A | 1/1978 | Johnson |
| 4,077,206 A | 3/1978 | Ayyagari |
| 4,085,578 A | 4/1978 | Kydd |
| 4,092,095 A | 5/1978 | Straitz, III |
| 4,101,294 A | 7/1978 | Kimura |
| 4,112,676 A | 9/1978 | DeCorso |
| 4,117,671 A | 10/1978 | Neal et al. |
| 4,160,640 A | 7/1979 | Maev et al. |
| 4,165,609 A | 8/1979 | Rudolph |
| 4,171,349 A | 10/1979 | Cucuiat et al. |
| 4,204,401 A | 5/1980 | Earnest |
| 4,222,240 A | 9/1980 | Castellano |
| 4,224,991 A | 9/1980 | Sowa et al. |
| 4,236,378 A | 12/1980 | Vogt |
| 4,253,301 A | 3/1981 | Vogt |
| 4,271,664 A | 6/1981 | Earnest |
| 4,344,486 A | 8/1982 | Parrish |
| 4,345,426 A | 8/1982 | Egnell et al. |
| 4,352,269 A | 10/1982 | Dineen |
| 4,380,895 A | 4/1983 | Adkins |
| 4,399,652 A | 8/1983 | Cole et al. |
| 4,414,334 A | 11/1983 | Hitzman |
| 4,434,613 A | 3/1984 | Stahl |
| 4,435,153 A | 3/1984 | Hashimoto et al. |
| 4,442,665 A | 4/1984 | Fick et al. |
| 4,445,842 A | 5/1984 | Syska |
| 4,479,484 A | 10/1984 | Davis |
| 4,480,985 A | 11/1984 | Davis |
| 4,488,865 A | 12/1984 | Davis |
| 4,498,288 A | 2/1985 | Vogt |
| 4,498,289 A | 2/1985 | Osgerby |
| 4,528,811 A | 7/1985 | Stahl |
| 4,543,784 A | 10/1985 | Kirker |
| 4,548,034 A | 10/1985 | Maguire |
| 4,561,245 A | 12/1985 | Ball |
| 4,569,310 A | 2/1986 | Davis |
| 4,577,462 A | 3/1986 | Robertson |
| 4,602,614 A | 7/1986 | Percival et al. |
| 4,606,721 A | 8/1986 | Livingston |
| 4,613,299 A | 9/1986 | Backheim |
| 4,637,792 A | 1/1987 | Davis |
| 4,651,712 A | 3/1987 | Davis |
| 4,653,278 A | 3/1987 | Vinson et al. |
| 4,681,678 A | 7/1987 | Leaseburge et al. |
| 4,684,465 A | 8/1987 | Leaseburge et al. |
| 4,753,666 A | 6/1988 | Pastor et al. |
| 4,762,543 A | 8/1988 | Pantermuehl et al. |
| 4,817,387 A | 4/1989 | Lashbrook |
| 4,858,428 A | 8/1989 | Paul |
| 4,895,710 A | 1/1990 | Hartmann et al. |
| 4,898,001 A | 2/1990 | Kuroda et al. |
| 4,946,597 A | 8/1990 | Sury |
| 4,976,100 A | 12/1990 | Lee |
| 5,014,785 A | 5/1991 | Puri et al. |
| 5,044,932 A | 9/1991 | Martin et al. |
| 5,073,105 A | 12/1991 | Martin et al. |
| 5,084,438 A | 1/1992 | Matsubara et al. |
| 5,085,274 A | 2/1992 | Puri et al. |
| 5,098,282 A | 3/1992 | Schwartz et al. |
| 5,123,248 A | 6/1992 | Monty et al. |
| 5,135,387 A | 8/1992 | Martin et al. |
| 5,141,049 A | 8/1992 | Larsen et al. |
| 5,142,866 A | 9/1992 | Yanagihara et al. |
| 5,147,111 A | 9/1992 | Montgomery |
| 5,154,596 A | 10/1992 | Schwartz et al. |
| 5,183,232 A | 2/1993 | Gale |
| 5,195,884 A | 3/1993 | Schwartz et al. |
| 5,197,289 A | 3/1993 | Glevicky et al. |
| 5,238,395 A | 8/1993 | Schwartz et al. |
| 5,255,506 A | 10/1993 | Wilkes et al. |
| 5,265,410 A | 11/1993 | Hisatome |
| 5,271,905 A | 12/1993 | Owen et al. |
| 5,275,552 A | 1/1994 | Schwartz et al. |
| 5,295,350 A | 3/1994 | Child et al. |
| 5,304,362 A | 4/1994 | Madsen |
| 5,325,660 A | 7/1994 | Taniguchi et al. |
| 5,332,036 A | 7/1994 | Shirley et al. |
| 5,344,307 A | 9/1994 | Schwartz et al. |
| 5,345,756 A | 9/1994 | Jahnke et al. |
| 5,355,668 A | 10/1994 | Weil et al. |
| 5,359,847 A | 11/1994 | Pillsbury et al. |
| 5,361,586 A | 11/1994 | McWhirter et al. |
| 5,388,395 A | 2/1995 | Scharpf et al. |
| 5,394,688 A | 3/1995 | Amos |
| 5,402,847 A | 4/1995 | Wilson et al. |
| 5,444,971 A | 8/1995 | Holenberger |
| 5,457,951 A | 10/1995 | Johnson et al. |
| 5,458,481 A | 10/1995 | Surbey et al. |
| 5,468,270 A | 11/1995 | Borszynski |
| 5,490,378 A | 2/1996 | Berger et al. |
| 5,542,840 A | 8/1996 | Surbey et al. |
| 5,566,756 A | 10/1996 | Chaback et al. |
| 5,572,862 A | 11/1996 | Mowill |
| 5,581,998 A | 12/1996 | Craig |
| 5,584,182 A | 12/1996 | Althaus et al. |
| 5,590,518 A | 1/1997 | Janes |
| 5,628,182 A | 5/1997 | Mowill |
| 5,634,329 A | 6/1997 | Andersson et al. |
| 5,638,675 A | 6/1997 | Zysman et al. |
| 5,640,840 A | 6/1997 | Briesch |
| 5,657,631 A | 8/1997 | Androsov |
| 5,680,764 A | 10/1997 | Viteri |
| 5,685,158 A | 11/1997 | Lenahan et al. |
| 5,709,077 A | 1/1998 | Beichel |
| 5,713,206 A | 2/1998 | McWhirter et al. |
| 5,715,673 A | 2/1998 | Beichel |
| 5,724,805 A | 3/1998 | Golomb et al. |
| 5,725,054 A | 3/1998 | Shayegi et al. |
| 5,733,941 A * | 3/1998 | Waycuilis ............... C01B 3/382 252/373 |
| 5,740,786 A | 4/1998 | Gartner |
| 5,743,079 A | 4/1998 | Walsh et al. |
| 5,765,363 A | 6/1998 | Mowill |
| 5,771,867 A | 6/1998 | Amstutz et al. |
| 5,771,868 A | 6/1998 | Khair |
| 5,819,540 A | 10/1998 | Massarani |
| 5,832,712 A | 11/1998 | Ronning et al. |
| 5,836,164 A | 11/1998 | Tsukahara et al. |
| 5,839,283 A | 11/1998 | Dobbeling |
| 5,850,732 A | 12/1998 | Willis et al. |
| 5,894,720 A | 4/1999 | Willis et al. |
| 5,901,547 A | 5/1999 | Smith et al. |
| 5,924,275 A | 7/1999 | Cohen et al. |
| 5,930,990 A | 8/1999 | Zachary et al. |
| 5,937,634 A | 8/1999 | Etheridge et al. |
| 5,950,417 A | 9/1999 | Robertson, Jr. et al. |
| 5,956,937 A | 9/1999 | Beichel |
| 5,968,349 A | 10/1999 | Duyvesteyn et al. |
| 5,974,780 A | 11/1999 | Santos |
| 5,992,388 A | 11/1999 | Seger |

(56) References Cited

U.S. PATENT DOCUMENTS

| | | | |
|---|---|---|---|
| 6,016,658 A | 1/2000 | Willis et al. | |
| 6,032,465 A | 3/2000 | Regnier | |
| 6,035,641 A | 3/2000 | Lokhandwala | |
| 6,062,026 A | 5/2000 | Woollenweber et al. | |
| 6,079,974 A | 6/2000 | Thompson | |
| 6,082,093 A | 7/2000 | Greenwood et al. | |
| 6,089,855 A | 7/2000 | Becker et al. | |
| 6,090,186 A * | 7/2000 | Spencer | B01D 53/1475 423/220 |
| 6,094,916 A | 8/2000 | Puri et al. | |
| 6,101,983 A | 8/2000 | Anand et al. | |
| 6,130,259 A * | 10/2000 | Waycuilis | C01B 3/382 252/373 |
| 6,148,602 A | 11/2000 | Demetri | |
| 6,170,264 B1 | 1/2001 | Viteri et al. | |
| 6,183,241 B1 | 2/2001 | Bohn et al. | |
| 6,201,029 B1 | 3/2001 | Waycuilis | |
| 6,202,400 B1 | 3/2001 | Utamura et al. | |
| 6,202,442 B1 | 3/2001 | Brugerolle | |
| 6,202,574 B1 | 3/2001 | Liljedahl et al. | |
| 6,209,325 B1 | 4/2001 | Alkabie | |
| 6,216,459 B1 | 4/2001 | Daudel et al. | |
| 6,216,549 B1 | 4/2001 | Davis et al. | |
| 6,230,103 B1 | 5/2001 | DeCorso et al. | |
| 6,237,339 B1 | 5/2001 | Åsen et al. | |
| 6,247,315 B1 | 6/2001 | Marin et al. | |
| 6,247,316 B1 | 6/2001 | Viteri | |
| 6,248,794 B1 | 6/2001 | Gieskes | |
| 6,253,555 B1 | 7/2001 | Willis | |
| 6,256,976 B1 | 7/2001 | Kataoka et al. | |
| 6,256,994 B1 | 7/2001 | Dillon, IV | |
| 6,263,659 B1 | 7/2001 | Dillon, IV et al. | |
| 6,266,954 B1 | 7/2001 | McCallum et al. | |
| 6,269,882 B1 | 8/2001 | Wellington et al. | |
| 6,276,171 B1 | 8/2001 | Brugerolle | |
| 6,282,901 B1 | 9/2001 | Marin et al. | |
| 6,283,087 B1 | 9/2001 | Isaksen | |
| 6,289,677 B1 | 9/2001 | Prociw et al. | |
| 6,298,652 B1 | 10/2001 | Mittricker et al. | |
| 6,298,654 B1 | 10/2001 | Vermes et al. | |
| 6,298,664 B1 | 10/2001 | Åsen et al. | |
| 6,301,888 B1 | 10/2001 | Gray, Jr. | |
| 6,301,889 B1 | 10/2001 | Gladden et al. | |
| 6,305,929 B1 | 10/2001 | Chung et al. | |
| 6,314,721 B1 | 11/2001 | Mathews et al. | |
| 6,324,867 B1 | 12/2001 | Fanning et al. | |
| 6,332,313 B1 | 12/2001 | Willis et al. | |
| 6,345,493 B1 | 2/2002 | Smith et al. | |
| 6,360,528 B1 | 3/2002 | Brausch et al. | |
| 6,363,709 B2 | 4/2002 | Kataoka et al. | |
| 6,367,258 B1 | 4/2002 | Wen et al. | |
| 6,370,870 B1 | 4/2002 | Kamijo et al. | |
| 6,374,591 B1 | 4/2002 | Johnson et al. | |
| 6,374,594 B1 | 4/2002 | Kraft et al. | |
| 6,383,461 B1 | 5/2002 | Lang | |
| 6,389,814 B2 | 5/2002 | Viteri et al. | |
| 6,405,536 B1 | 6/2002 | Ho et al. | |
| 6,412,278 B1 | 7/2002 | Matthews | |
| 6,412,302 B1 | 7/2002 | Foglietta | |
| 6,412,559 B1 | 7/2002 | Gunter et al. | |
| 6,418,725 B1 | 7/2002 | Maeda et al. | |
| 6,429,020 B1 | 8/2002 | Thornton et al. | |
| 6,449,954 B2 | 9/2002 | Bachmann | |
| 6,450,256 B2 | 9/2002 | Mones | |
| 6,461,147 B1 | 10/2002 | Sonju et al. | |
| 6,467,270 B2 | 10/2002 | Mulloy et al. | |
| 6,470,682 B2 | 10/2002 | Gray, Jr. | |
| 6,475,460 B1 * | 11/2002 | Max | B01D 53/62 423/437.1 |
| 6,477,859 B2 | 11/2002 | Wong et al. | |
| 6,484,503 B1 | 11/2002 | Raz | |
| 6,484,507 B1 | 11/2002 | Pradt | |
| 6,487,863 B1 | 12/2002 | Chen et al. | |
| 6,499,990 B1 | 12/2002 | Zink et al. | |
| 6,502,383 B1 | 1/2003 | Janardan et al. | |
| 6,505,567 B1 | 1/2003 | Anderson et al. | |
| 6,505,683 B2 | 1/2003 | Minkkinen et al. | |
| 6,508,209 B1 | 1/2003 | Collier, Jr. | |
| 6,523,349 B2 | 2/2003 | Viteri | |
| 6,532,745 B1 | 3/2003 | Neary | |
| 6,539,716 B2 | 4/2003 | Finger et al. | |
| 6,584,775 B1 | 7/2003 | Schneider et al. | |
| 6,598,398 B2 | 7/2003 | Viteri et al. | |
| 6,598,399 B2 | 7/2003 | Liebig | |
| 6,598,402 B2 | 7/2003 | Kataoka et al. | |
| 6,606,861 B2 | 8/2003 | Snyder | |
| 6,612,291 B2 | 9/2003 | Sakamoto | |
| 6,615,576 B2 | 9/2003 | Sheoran et al. | |
| 6,615,589 B2 | 9/2003 | Allam et al. | |
| 6,622,470 B2 | 9/2003 | Viteri et al. | |
| 6,622,645 B2 | 9/2003 | Havlena | |
| 6,637,183 B2 | 10/2003 | Viteri et al. | |
| 6,644,041 B1 | 11/2003 | Eyermann | |
| 6,655,150 B1 | 12/2003 | Åsen et al. | |
| 6,668,541 B2 | 12/2003 | Rice et al. | |
| 6,672,863 B2 | 1/2004 | Doebbeling et al. | |
| 6,675,579 B1 | 1/2004 | Yang | |
| 6,684,643 B2 | 2/2004 | Frutschi | |
| 6,694,735 B2 | 2/2004 | Sumser et al. | |
| 6,698,412 B2 | 3/2004 | Dalla Betta | |
| 6,702,570 B2 | 3/2004 | Shah et al. | |
| 6,722,436 B2 | 4/2004 | Krill | |
| 6,725,665 B2 | 4/2004 | Tuschy et al. | |
| 6,731,501 B1 | 5/2004 | Cheng | |
| 6,732,531 B2 | 5/2004 | Dickey | |
| 6,742,506 B1 | 6/2004 | Grandin | |
| 6,743,829 B2 | 6/2004 | Fischer-Calderon et al. | |
| 6,745,573 B2 | 6/2004 | Marin et al. | |
| 6,745,624 B2 | 6/2004 | Porter et al. | |
| 6,748,004 B2 | 6/2004 | Jepson | |
| 6,752,620 B2 | 6/2004 | Heier et al. | |
| 6,767,527 B1 | 7/2004 | Åsen et al. | |
| 6,772,583 B2 | 8/2004 | Bland | |
| 6,790,030 B2 | 9/2004 | Fischer et al. | |
| 6,805,483 B2 | 10/2004 | Tomlinson et al. | |
| 6,810,673 B2 | 11/2004 | Snyder | |
| 6,813,889 B2 | 11/2004 | Inoue et al. | |
| 6,817,187 B2 | 11/2004 | Yu | |
| 6,820,428 B2 | 11/2004 | Wylie | |
| 6,821,501 B2 | 11/2004 | Matzakos et al. | |
| 6,823,852 B2 | 11/2004 | Collier, Jr. | |
| 6,824,710 B2 | 11/2004 | Viteri et al. | |
| 6,826,912 B2 | 12/2004 | Levy et al. | |
| 6,826,913 B2 | 12/2004 | Wright | |
| 6,838,071 B1 | 1/2005 | Olsvik et al. | |
| 6,851,413 B1 | 2/2005 | Tamol, Sr. | |
| 6,868,677 B2 | 3/2005 | Viteri et al. | |
| 6,886,334 B2 | 5/2005 | Shirakawa | |
| 6,887,069 B1 | 5/2005 | Thornton et al. | |
| 6,899,859 B1 | 5/2005 | Olsvik | |
| 6,901,760 B2 | 6/2005 | Dittmann et al. | |
| 6,904,815 B2 | 6/2005 | Widmer | |
| 6,907,737 B2 | 6/2005 | Mittricker et al. | |
| 6,910,335 B2 | 6/2005 | Viteri et al. | |
| 6,923,915 B2 | 8/2005 | Alford et al. | |
| 6,939,130 B2 | 9/2005 | Abbasi et al. | |
| 6,945,029 B2 | 9/2005 | Viteri | |
| 6,945,052 B2 | 9/2005 | Frutschi et al. | |
| 6,945,087 B2 | 9/2005 | Porter et al. | |
| 6,945,089 B2 | 9/2005 | Barie et al. | |
| 6,946,419 B2 | 9/2005 | Kaefer | |
| 6,969,123 B2 | 11/2005 | Vinegar et al. | |
| 6,971,242 B2 | 12/2005 | Boardman | |
| 6,981,358 B2 | 1/2006 | Bellucci et al. | |
| 6,988,549 B1 | 1/2006 | Babcock | |
| 6,993,901 B2 | 2/2006 | Shirakawa | |
| 6,993,916 B2 | 2/2006 | Johnson et al. | |
| 6,994,491 B2 | 2/2006 | Kittle | |
| 7,007,487 B2 | 3/2006 | Belokon et al. | |
| 7,010,921 B2 | 3/2006 | Intile et al. | |
| 7,011,154 B2 | 3/2006 | Maher et al. | |
| 7,015,271 B2 | 3/2006 | Bice et al. | |
| 7,032,388 B2 | 4/2006 | Healy | |
| 7,040,400 B2 | 5/2006 | de Rouffignac et al. | |

(56) References Cited

U.S. PATENT DOCUMENTS

| | | | |
|---|---|---|---|
| 7,043,898 B2 | 5/2006 | Rago | |
| 7,043,920 B2 | 5/2006 | Viteri et al. | |
| 7,045,553 B2 | 5/2006 | Hershkowitz | |
| 7,053,128 B2 | 5/2006 | Hershkowitz | |
| 7,056,482 B2 | 6/2006 | Hakka et al. | |
| 7,059,152 B2 | 6/2006 | Oakey et al. | |
| 7,065,953 B1 | 6/2006 | Kopko | |
| 7,065,972 B2 | 6/2006 | Zupanc et al. | |
| 7,074,033 B2 | 7/2006 | Neary | |
| 7,077,199 B2 | 7/2006 | Vinegar et al. | |
| 7,089,743 B2 | 8/2006 | Frutschi et al. | |
| 7,096,942 B1 | 8/2006 | de Rouffignac et al. | |
| 7,097,925 B2 | 8/2006 | Keefer | |
| 7,104,319 B2 | 9/2006 | Vinegar et al. | |
| 7,104,784 B1 | 9/2006 | Hasegawa et al. | |
| 7,124,589 B2 | 10/2006 | Neary | |
| 7,137,256 B1 | 11/2006 | Stuttaford et al. | |
| 7,137,623 B2 | 11/2006 | Mockry et al. | |
| 7,143,572 B2 | 12/2006 | Ooka et al. | |
| 7,143,606 B2 | 12/2006 | Tranier | |
| 7,146,969 B2 | 12/2006 | Weirich | |
| 7,147,461 B2 | 12/2006 | Neary | |
| 7,148,261 B2 | 12/2006 | Hershkowitz et al. | |
| 7,152,409 B2 | 12/2006 | Yee et al. | |
| 7,162,875 B2 | 1/2007 | Fletcher et al. | |
| 7,168,265 B2 | 1/2007 | Briscoe et al. | |
| 7,168,488 B2 | 1/2007 | Olsvik et al. | |
| 7,183,328 B2 | 2/2007 | Hershkowitz et al. | |
| 7,185,497 B2 | 3/2007 | Dudebout et al. | |
| 7,194,869 B2 | 3/2007 | McQuiggan et al. | |
| 7,197,880 B2 | 4/2007 | Thornton et al. | |
| 7,217,303 B2 | 5/2007 | Hershkowitz et al. | |
| 7,225,623 B2 | 6/2007 | Koshoffer | |
| 7,237,385 B2 | 7/2007 | Carrea | |
| 7,284,362 B2 | 10/2007 | Marin et al. | |
| 7,299,619 B2 | 11/2007 | Briesch et al. | |
| 7,299,868 B2 * | 11/2007 | Zapadinski | E21B 41/0064 166/265 |
| 7,302,801 B2 | 12/2007 | Chen | |
| 7,305,817 B2 | 12/2007 | Blodgett et al. | |
| 7,305,831 B2 | 12/2007 | Carrea et al. | |
| 7,313,916 B2 | 1/2008 | Pellizzari | |
| 7,318,317 B2 | 1/2008 | Carrea | |
| 7,343,742 B2 | 3/2008 | Wimmer et al. | |
| 7,353,655 B2 | 4/2008 | Bolis et al. | |
| 7,357,857 B2 | 4/2008 | Hart et al. | |
| 7,363,756 B2 | 4/2008 | Carrea et al. | |
| 7,363,764 B2 | 4/2008 | Griffin et al. | |
| 7,381,393 B2 | 6/2008 | Lynn | |
| 7,401,577 B2 | 7/2008 | Saucedo et al. | |
| 7,410,525 B1 | 8/2008 | Liu et al. | |
| 7,416,137 B2 | 8/2008 | Hagen et al. | |
| 7,434,384 B2 | 10/2008 | Lord et al. | |
| 7,438,744 B2 | 10/2008 | Beaumont | |
| 7,467,942 B2 | 12/2008 | Carroni et al. | |
| 7,468,173 B2 | 12/2008 | Hughes et al. | |
| 7,472,550 B2 | 1/2009 | Lear, Jr. et al. | |
| 7,481,048 B2 | 1/2009 | Harmon et al. | |
| 7,481,275 B2 | 1/2009 | Olsvik et al. | |
| 7,482,500 B2 | 1/2009 | Johann et al. | |
| 7,485,761 B2 | 2/2009 | Schindler et al. | |
| 7,488,857 B2 | 2/2009 | Johann et al. | |
| 7,490,472 B2 | 2/2009 | Lynghjem et al. | |
| 7,491,250 B2 | 2/2009 | Hershkowitz et al. | |
| 7,492,054 B2 | 2/2009 | Catlin | |
| 7,493,769 B2 | 2/2009 | Jangili | |
| 7,498,009 B2 | 3/2009 | Leach et al. | |
| 7,503,178 B2 | 3/2009 | Bucker et al. | |
| 7,503,948 B2 | 3/2009 | Hershkowitz et al. | |
| 7,506,501 B2 | 3/2009 | Anderson et al. | |
| 7,513,099 B2 | 4/2009 | Nuding et al. | |
| 7,513,100 B2 | 4/2009 | Motter et al. | |
| 7,516,626 B2 | 4/2009 | Brox et al. | |
| 7,520,134 B2 | 4/2009 | Durbin et al. | |
| 7,523,603 B2 | 4/2009 | Hagen et al. | |
| 7,536,252 B1 | 5/2009 | Hibshman, II et al. | |
| 7,536,873 B2 | 5/2009 | Nohlen | |
| 7,540,150 B2 | 6/2009 | Schmid et al. | |
| 7,559,977 B2 | 7/2009 | Fleischer et al. | |
| 7,562,519 B1 | 7/2009 | Harris et al. | |
| 7,562,529 B2 | 7/2009 | Kuspert et al. | |
| 7,566,394 B2 | 7/2009 | Koseoglu | |
| 7,574,856 B2 | 8/2009 | Mak | |
| 7,591,866 B2 | 9/2009 | Bose | |
| 7,594,386 B2 | 9/2009 | Narayanan et al. | |
| 7,610,752 B2 | 11/2009 | Dalla Betta et al. | |
| 7,610,759 B2 | 11/2009 | Yoshida et al. | |
| 7,611,681 B2 | 11/2009 | Kaefer | |
| 7,614,352 B2 | 11/2009 | Anthony et al. | |
| 7,618,606 B2 | 11/2009 | Fan et al. | |
| 7,631,493 B2 | 12/2009 | Shirakawa et al. | |
| 7,634,915 B2 | 12/2009 | Hoffmann et al. | |
| 7,635,408 B2 | 12/2009 | Mak et al. | |
| 7,637,093 B2 | 12/2009 | Rao | |
| 7,644,573 B2 | 1/2010 | Smith et al. | |
| 7,650,744 B2 | 1/2010 | Varatharajan et al. | |
| 7,654,320 B2 | 2/2010 | Payton | |
| 7,654,330 B2 | 2/2010 | Zubrin et al. | |
| 7,655,071 B2 | 2/2010 | De Vreede | |
| 7,670,135 B1 | 3/2010 | Zink et al. | |
| 7,673,454 B2 | 3/2010 | Saito et al. | |
| 7,673,685 B2 | 3/2010 | Huntley Shaw et al. | |
| 7,674,443 B1 | 3/2010 | Davis | |
| 7,677,309 B2 | 3/2010 | Shaw et al. | |
| 7,681,394 B2 | 3/2010 | Haugen | |
| 7,682,597 B2 | 3/2010 | Blumenfeld et al. | |
| 7,690,204 B2 | 4/2010 | Drnevich et al. | |
| 7,691,788 B2 | 4/2010 | Tan et al. | |
| 7,695,703 B2 | 4/2010 | Sobolevskiy et al. | |
| 7,717,173 B2 | 5/2010 | Grott | |
| 7,721,543 B2 | 5/2010 | Massey et al. | |
| 7,726,114 B2 | 6/2010 | Evulet | |
| 7,734,408 B2 | 6/2010 | Shiraki | |
| 7,739,864 B2 | 6/2010 | Finkenrath et al. | |
| 7,749,311 B2 | 7/2010 | Saito et al. | |
| 7,752,848 B2 | 7/2010 | Balan et al. | |
| 7,752,850 B2 | 7/2010 | Laster et al. | |
| 7,753,039 B2 | 7/2010 | Harima et al. | |
| 7,753,972 B2 | 7/2010 | Zubrin et al. | |
| 7,762,084 B2 | 7/2010 | Martis et al. | |
| 7,763,163 B2 | 7/2010 | Koseoglu | |
| 7,763,227 B2 | 7/2010 | Wang | |
| 7,765,810 B2 | 8/2010 | Pfefferle | |
| 7,788,897 B2 | 9/2010 | Campbell et al. | |
| 7,789,159 B1 | 9/2010 | Bader | |
| 7,789,658 B2 | 9/2010 | Towler et al. | |
| 7,789,944 B2 | 9/2010 | Saito et al. | |
| 7,793,494 B2 | 9/2010 | Wirth et al. | |
| 7,802,434 B2 | 9/2010 | Varatharajan et al. | |
| 7,815,873 B2 | 10/2010 | Sankaranarayanan et al. | |
| 7,815,892 B2 | 10/2010 | Hershkowitz et al. | |
| 7,819,951 B2 | 10/2010 | White et al. | |
| 7,824,179 B2 | 11/2010 | Hasegawa et al. | |
| 7,827,778 B2 | 11/2010 | Finkenrath et al. | |
| 7,827,794 B1 | 11/2010 | Pronske et al. | |
| 7,841,186 B2 | 11/2010 | So et al. | |
| 7,845,406 B2 | 12/2010 | Nitschke | |
| 7,846,401 B2 | 12/2010 | Hershkowitz et al. | |
| 7,861,511 B2 | 1/2011 | Chillar et al. | |
| 7,874,140 B2 | 1/2011 | Fan et al. | |
| 7,874,350 B2 | 1/2011 | Pfefferle | |
| 7,875,402 B2 | 1/2011 | Hershkowitz et al. | |
| 7,882,692 B2 | 2/2011 | Pronske et al. | |
| 7,886,522 B2 | 2/2011 | Kammel | |
| 7,895,822 B2 | 3/2011 | Hoffmann et al. | |
| 7,896,105 B2 | 3/2011 | Dupriest | |
| 7,906,304 B2 | 3/2011 | Kohr | |
| 7,909,898 B2 | 3/2011 | White et al. | |
| 7,914,749 B2 | 3/2011 | Carstens et al. | |
| 7,914,764 B2 | 3/2011 | Hershkowitz et al. | |
| 7,918,906 B2 | 4/2011 | Zubrin et al. | |
| 7,921,633 B2 | 4/2011 | Rising | |
| 7,922,871 B2 | 4/2011 | Price et al. | |
| 7,926,292 B2 | 4/2011 | Rabovitser et al. | |

(56) References Cited

U.S. PATENT DOCUMENTS

| | | |
|---|---|---|
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |
| 7,943,097 B2 | 5/2011 | Golden et al. |
| 7,955,403 B2 | 6/2011 | Ariyapadi et al. |
| 7,966,822 B2 | 6/2011 | Myers et al. |
| 7,976,803 B2 | 7/2011 | Hooper et al. |
| 7,980,312 B1 | 7/2011 | Hill et al. |
| 7,985,399 B2 | 7/2011 | Drnevich et al. |
| 7,988,750 B2 | 8/2011 | Lee et al. |
| 8,001,789 B2 | 8/2011 | Vega et al. |
| 8,029,273 B2 | 10/2011 | Paschereit et al. |
| 8,036,813 B2 | 10/2011 | Tonetti et al. |
| 8,038,416 B2 | 10/2011 | Ono et al. |
| 8,038,746 B2 | 10/2011 | Clark |
| 8,038,773 B2 | 10/2011 | Ochs et al. |
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,083,474 B2 | 12/2011 | Hashimoto et al. |
| 8,097,230 B2 | 1/2012 | Mesters et al. |
| 8,101,146 B2 | 1/2012 | Fedeyko et al. |
| 8,105,559 B2 | 1/2012 | Melville et al. |
| 8,110,012 B2 | 2/2012 | Chiu et al. |
| 8,117,825 B2 | 2/2012 | Griffin et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 | 5/2012 | Draper |
| 8,167,960 B2 | 5/2012 | Gil |
| 8,176,982 B2 | 5/2012 | Gil et al. |
| 8,191,360 B2 | 6/2012 | Fong et al. |
| 8,191,361 B2 | 6/2012 | Fong et al. |
| 8,196,387 B2 | 6/2012 | Shah et al. |
| 8,196,413 B2 | 6/2012 | Mak |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,232,438 B2 * | 7/2012 | Jones .............. E21B 43/34 166/244.1 |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Dion Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,282 B2 | 4/2013 | Vollmer et al. |
| 8,424,601 B2 | 4/2013 | Betzer-Zilevitch |
| 8,436,489 B2 | 5/2013 | Stahlkopf et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,539,749 B1 | 9/2013 | Wichmann et al. |
| 8,567,200 B2 | 10/2013 | Brook et al. |
| 8,616,294 B2 | 12/2013 | Zubrin et al. |
| 8,627,643 B2 | 1/2014 | Chillar et al. |
| 9,121,259 B2 * | 9/2015 | Bryant .............. E21B 41/0064 |
| 2001/0000049 A1 | 3/2001 | Kataoka et al. |
| 2001/0029732 A1 | 10/2001 | Bachmann |
| 2001/0045090 A1 | 11/2001 | Gray, Jr. |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0155047 A1 * | 10/2002 | Max .................. B01D 3/14 422/245.1 |
| 2002/0187449 A1 | 12/2002 | Doebbeling et al. |
| 2003/0005698 A1 | 1/2003 | Keller |
| 2003/0131582 A1 | 7/2003 | Anderson et al. |
| 2003/0134241 A1 | 7/2003 | Marin et al. |
| 2003/0221409 A1 | 12/2003 | McGowan |
| 2004/0006994 A1 | 1/2004 | Walsh et al. |
| 2004/0068981 A1 | 4/2004 | Siefker et al. |
| 2004/0166034 A1 | 8/2004 | Kaefer |
| 2004/0170559 A1 | 9/2004 | Hershkowitz et al. |
| 2004/0200618 A1 | 10/2004 | Piekenbrock .............. 166/305.1 |
| 2004/0223408 A1 | 11/2004 | Mathys et al. |
| 2004/0238654 A1 | 12/2004 | Hagen et al. |
| 2005/0028529 A1 | 2/2005 | Bartlett et al. |
| 2005/0144961 A1 | 7/2005 | Colibaba-Evulet et al. |
| 2005/0197267 A1 | 9/2005 | Zaki et al. |
| 2005/0229585 A1 | 10/2005 | Webster |
| 2005/0236602 A1 | 10/2005 | Viteri et al. |
| 2006/0112675 A1 | 6/2006 | Anderson et al. |
| 2006/0158961 A1 | 7/2006 | Ruscheweyh et al. |
| 2006/0183009 A1 | 8/2006 | Berlowitz et al. |
| 2006/0196812 A1 | 9/2006 | Beetge et al. |
| 2006/0248888 A1 | 11/2006 | Geskes |
| 2007/0000242 A1 | 1/2007 | Harmon et al. |
| 2007/0044475 A1 | 3/2007 | Leser et al. |
| 2007/0044479 A1 | 3/2007 | Brandt et al. |
| 2007/0089425 A1 | 4/2007 | Motter et al. |
| 2007/0107430 A1 | 5/2007 | Schmid et al. |
| 2007/0144747 A1 | 6/2007 | Steinberg |
| 2007/0231233 A1 | 10/2007 | Bose |
| 2007/0234702 A1 | 10/2007 | Hagen et al. |
| 2007/0245736 A1 | 10/2007 | Barnicki |
| 2007/0249738 A1 | 10/2007 | Haynes et al. |
| 2007/0272201 A1 | 11/2007 | Amano et al. |
| 2008/0000229 A1 | 1/2008 | Kuspert et al. |
| 2008/0006561 A1 | 1/2008 | Moran et al. |
| 2008/0010967 A1 | 1/2008 | Griffin et al. |
| 2008/0034727 A1 | 2/2008 | Sutikno |
| 2008/0038598 A1 | 2/2008 | Berlowitz et al. |
| 2008/0047280 A1 | 2/2008 | Dubar |
| 2008/0066443 A1 | 3/2008 | Frutschi et al. |
| 2008/0115478 A1 | 5/2008 | Sullivan |
| 2008/0118310 A1 | 5/2008 | Graham |
| 2008/0127632 A1 | 6/2008 | Finkenrath et al. |
| 2008/0155984 A1 | 7/2008 | Liu et al. |
| 2008/0178611 A1 | 7/2008 | Ding |
| 2008/0202123 A1 | 8/2008 | Sullivan et al. |
| 2008/0223038 A1 | 9/2008 | Lutz et al. |
| 2008/0250795 A1 | 10/2008 | Katdare et al. |
| 2008/0251234 A1 | 10/2008 | Wilson et al. |

(56) References Cited

U.S. PATENT DOCUMENTS

| | | | |
|---|---|---|---|
| 2008/0268300 A1 | 10/2008 | Pfefferle | 429/17 |
| 2008/0290719 A1 | 11/2008 | Kaminsky et al. | |
| 2008/0309087 A1 | 12/2008 | Evulet et al. | |
| 2009/0000762 A1 | 1/2009 | Wilson et al. | |
| 2009/0025390 A1 | 1/2009 | Christensen et al. | |
| 2009/0038247 A1 | 2/2009 | Taylor et al. | |
| 2009/0056342 A1 | 3/2009 | Kirzhner | |
| 2009/0064653 A1 | 3/2009 | Hagen et al. | |
| 2009/0071166 A1 | 3/2009 | Hagen et al. | |
| 2009/0107141 A1 | 4/2009 | Chillar et al. | |
| 2009/0117024 A1 | 5/2009 | Weedon et al. | |
| 2009/0120087 A1 | 5/2009 | Sumser et al. | |
| 2009/0157230 A1 | 6/2009 | Hibshman, II et al. | |
| 2009/0193809 A1 | 8/2009 | Schroder et al. | |
| 2009/0205334 A1 | 8/2009 | Aljabari et al. | |
| 2009/0218821 A1 | 9/2009 | ElKady et al. | |
| 2009/0223227 A1 | 9/2009 | Lipinski et al. | |
| 2009/0229263 A1 | 9/2009 | Ouellet et al. | |
| 2009/0235637 A1 | 9/2009 | Foret | |
| 2009/0241506 A1 | 10/2009 | Nilsson | |
| 2009/0255242 A1 | 10/2009 | Paterson et al. | |
| 2009/0262599 A1 | 10/2009 | Kohrs et al. | |
| 2009/0284013 A1 | 11/2009 | Anand et al. | |
| 2009/0301054 A1 | 12/2009 | Simpson et al. | |
| 2009/0301099 A1 | 12/2009 | Nigro | |
| 2010/0003123 A1 | 1/2010 | Smith | |
| 2010/0006281 A1* | 1/2010 | DuBrucq | B01D 5/0009 166/249 |
| 2010/0018218 A1 | 1/2010 | Riley et al. | |
| 2010/0058732 A1 | 3/2010 | Kaufmann et al. | |
| 2010/0115960 A1 | 5/2010 | Brautsch et al. | |
| 2010/0126176 A1 | 5/2010 | Kim | |
| 2010/0126906 A1 | 5/2010 | Sury | |
| 2010/0162703 A1 | 7/2010 | Li et al. | |
| 2010/0170253 A1 | 7/2010 | Berry et al. | |
| 2010/0180565 A1 | 7/2010 | Draper | |
| 2010/0300102 A1 | 12/2010 | Bathina et al. | |
| 2010/0310439 A1 | 12/2010 | Brok et al. | |
| 2010/0322759 A1 | 12/2010 | Tanioka | |
| 2010/0326084 A1 | 12/2010 | Anderson et al. | |
| 2011/0000221 A1 | 1/2011 | Minta et al. | |
| 2011/0000671 A1 | 1/2011 | Hershkowitz et al. | |
| 2011/0036082 A1 | 2/2011 | Collinot | |
| 2011/0048002 A1 | 3/2011 | Taylor et al. | |
| 2011/0048010 A1 | 3/2011 | Balcezak et al. | |
| 2011/0062012 A1* | 3/2011 | Robinson | C10J 3/00 201/2.5 |
| 2011/0072779 A1 | 3/2011 | ELKady et al. | |
| 2011/0088379 A1 | 4/2011 | Nanda | |
| 2011/0110759 A1 | 5/2011 | Sanchez et al. | |
| 2011/0126512 A1 | 6/2011 | Anderson | |
| 2011/0138766 A1 | 6/2011 | ELKady et al. | |
| 2011/0162353 A1 | 7/2011 | Vanvolsem et al. | |
| 2011/0205837 A1 | 8/2011 | Gentgen | |
| 2011/0226010 A1 | 9/2011 | Baxter | |
| 2011/0227346 A1 | 9/2011 | Klenven | |
| 2011/0232545 A1 | 9/2011 | Clements | |
| 2011/0239653 A1 | 10/2011 | Valeev et al. | |
| 2011/0265447 A1 | 11/2011 | Cunningham | |
| 2011/0300493 A1 | 12/2011 | Mittricker et al. | |
| 2012/0023954 A1 | 2/2012 | Wichmann | |
| 2012/0023955 A1 | 2/2012 | Draper | |
| 2012/0023956 A1 | 2/2012 | Popovic | |
| 2012/0023957 A1 | 2/2012 | Draper et al. | |
| 2012/0023958 A1 | 2/2012 | Snook et al. | |
| 2012/0023960 A1 | 2/2012 | Minto | |
| 2012/0023962 A1 | 2/2012 | Wichmann et al. | |
| 2012/0023963 A1 | 2/2012 | Wichmann et al. | |
| 2012/0023966 A1 | 2/2012 | Ouellet et al. | |
| 2012/0031581 A1 | 2/2012 | Chillar et al. | |
| 2012/0032810 A1 | 2/2012 | Chillar et al. | |
| 2012/0035405 A1 | 2/2012 | Hester et al. | 585/833 |
| 2012/0085100 A1 | 4/2012 | Hughes et al. | |
| 2012/0096870 A1 | 4/2012 | Wichmann et al. | |
| 2012/0119512 A1 | 5/2012 | Draper | |
| 2012/0131925 A1 | 5/2012 | Mittricker et al. | |
| 2012/0144837 A1 | 6/2012 | Rasmussen et al. | |
| 2012/0185144 A1 | 7/2012 | Draper | |
| 2012/0192565 A1 | 8/2012 | Tretyakov et al. | |
| 2012/0247105 A1 | 10/2012 | Nelson et al. | |
| 2012/0260660 A1 | 10/2012 | Kraemer et al. | |
| 2013/0017460 A1* | 1/2013 | Keefer | B01D 53/047 429/419 |
| 2013/0086916 A1 | 4/2013 | Oelfke et al. | |
| 2013/0086917 A1 | 4/2013 | Slobodyanskiy et al. | |
| 2013/0091853 A1 | 4/2013 | Denton et al. | |
| 2013/0091854 A1 | 4/2013 | Gupta et al. | |
| 2013/0104562 A1 | 5/2013 | Oelfke et al. | |
| 2013/0104563 A1 | 5/2013 | Oelfke et al. | |
| 2013/0125554 A1 | 5/2013 | Mittricker et al. | |
| 2013/0125555 A1 | 5/2013 | Mittricker et al. | |
| 2013/0232980 A1 | 9/2013 | Chen et al. | |
| 2013/0269310 A1 | 10/2013 | Wichmann et al. | |
| 2013/0269311 A1 | 10/2013 | Wichmann et al. | |
| 2013/0269355 A1 | 10/2013 | Wichmann et al. | |
| 2013/0269356 A1 | 10/2013 | Butkiewicz et al. | |
| 2013/0269357 A1 | 10/2013 | Wichmann et al. | |
| 2013/0269358 A1 | 10/2013 | Wichmann et al. | |
| 2013/0269360 A1 | 10/2013 | Wichmann et al. | |
| 2013/0269361 A1 | 10/2013 | Wichmann et al. | |
| 2013/0269362 A1 | 10/2013 | Wichmann et al. | |
| 2013/0283808 A1 | 10/2013 | Kolvick | |
| 2013/0298761 A1* | 11/2013 | Hamad | F01N 3/04 95/11 |
| 2013/0312386 A1 | 11/2013 | Wirsum et al. | 60/39.182 |
| 2014/0000271 A1 | 1/2014 | Mittricker et al. | |
| 2014/0000273 A1 | 1/2014 | Mittricker et al. | |
| 2014/0007590 A1* | 1/2014 | Huntington | B01D 53/62 60/801 |
| 2014/0013766 A1* | 1/2014 | Mittricker | F02C 3/20 60/783 |
| 2014/0020398 A1 | 1/2014 | Mittricker et al. | |
| 2014/0083109 A1* | 3/2014 | Oelfke | F02C 3/34 60/772 |
| 2014/0123620 A1* | 5/2014 | Huntington | F02M 25/0731 60/39.52 |
| 2014/0123672 A1* | 5/2014 | Huntington | F02C 7/22 60/777 |
| 2014/0250908 A1* | 9/2014 | Huntington | F02C 9/00 60/776 |
| 2014/0250911 A1* | 9/2014 | Huntington | F25J 1/0022 60/780 |
| 2014/0250912 A1* | 9/2014 | Huntington | F01K 13/00 60/783 |
| 2015/0059350 A1* | 3/2015 | Kolvick | F02C 3/34 60/772 |
| 2015/0308293 A1* | 10/2015 | Huntington | F02C 3/34 60/772 |
| 2016/0017800 A1* | 1/2016 | Simpson | F01K 19/00 429/422 |

FOREIGN PATENT DOCUMENTS

| | | | |
|---|---|---|---|
| EP | 0770771 | 5/1997 | |
| GB | 0776269 | 6/1957 | |
| GB | 2117053 | 10/1983 | |
| JP | 2000-061293 | 2/2000 | B01D 53/62 |
| JP | 2010-029591 | 9/2010 | E21B 43/00 |
| WO | WO9906674 | 2/1999 | |
| WO | WO9963210 | 12/1999 | |
| WO | WO2007068682 | 6/2007 | |
| WO | WO2008142009 | 11/2008 | |
| WO | WO2011003606 | 1/2011 | |
| WO | WO2012003489 | 1/2012 | |
| WO | WO2012128928 | 9/2012 | |
| WO | WO2012128929 | 9/2012 | |
| WO | WO2012170114 | 12/2012 | |
| WO | WO2013/095829 | 6/2013 | E21B 43/16 |
| WO | WO2013147632 | 10/2013 | |
| WO | WO2013147633 | 10/2013 | |

(56) References Cited

FOREIGN PATENT DOCUMENTS

| WO | WO2013155214 | 10/2013 |
|----|--------------|---------|
| WO | WO2013163045 | 10/2013 |

OTHER PUBLICATIONS

U.S. Appl. No. 14/175,715, filed Feb. 7, 2014, Huntington, R. A. et al.
U.S. Appl. No. 14/182,035, filed Feb. 7, 2014, Huntington, R. A. et al.
U.S. Appl. No. 14/182,048, filed Feb. 17, 2014, Huntington, R. A. et al.
U.S. Appl. No. 14/182,058, filed Feb. 17, 2014, Beutel, T. W. et al.
U.S. Appl. No. 14/188,545, filed Feb. 24, 2014, Huntington, R. A. et al.
U.S. Appl. No. 14/279,095, filed May 15, 2014, Moorkanikkara, S. N. et al.
U.S. Appl. No. 14/301,551, filed Jun. 11, 2014, Denton, Robert D. et al.
U.S. Appl. No. 14/301,979, filed Jun. 11, 2014, Subramaniyan, M. et al.
U.S. Appl. No. 14/302,028, filed Jun. 11, 2014, Zuo, Baifang et al.
U.S. Appl. No. 14/312,659, filed Jun. 23, 2014, Thatcher, J. C. et al.
U.S. Appl. No. 14/312,665, filed Jun. 23, 2014, Minto, K. D. et al.
U.S. Appl. No. 14/314,575, filed Jun. 25, 2014, Andrew, Philip L.
U.S. Appl. No. 14/314,601, filed Jun. 25, 2014, Vaezi, Vahid et al.
U.S. Appl. No. 14/321,690, filed Jul. 1, 2014, White, E. D. et al.
U.S. Appl. No. 14/444,601, filed Jul. 28, 2014, Slobodyanskiy, I. A. et al.
Ahmed, S. et al. (1998) "Catalytic Partial Oxidation Reforming of Hydrocarbon Fuels," 1998 Fuel Cell Seminar, 7 pgs.
Air Products and Chemicals, Inc. (2008) "Air Separation Technology—Ion Transport Membrane (ITM)," www.airproducts.com/ASUsales, 3 pgs.
Air Products and Chemicals, Inc. (2011) "Air Separation Technology Ion Transport Membrane (ITM)," www.airproducts.com/gasification, 4 pgs.
Anderson, R. E. (2006) "Durability and Reliability Demonstration of a Near-Zero-Emission Gas-Fired Power Plant," California Energy Comm., CEC 500-2006-074, 80 pgs.
Baxter, E. et al. (2003) "Fabricate and Test an Advanced Non-Polluting Turbine Drive Gas Generator," U.S. Dept. of Energy, Nat'l Energy Tech. Lab., DE-FC26-00NT 40804, 51 pgs.
Bolland, O. et al. (1998) "Removal of CO2 From Gas Turbine Power Plants Evaluation of Pre- and Postcombustion Methods," SINTEF Group, www.energy.sintef.no/publ/xergi/98/3/art-8engelsk.htm, 11 pgs.
BP Press Release (2006) "BP and Edison Mission Group Plan Major Hydrogen Power Project for California," www.bp.com/hydrogenpower, 2 pgs.
Bryngelsson, M. et al. (2005) "Feasibility Study of $CO_2$ Removal From Pressurized Flue Gas in a Fully Fired Combined Cycle—The Sargas Project," KTH—Royal Institute of Technology, Dept. of Chemical Engineering and Technology, 9 pgs.
Caldwell Energy Company (2011) "Wet Compression"; IGTI 2011—CTIC Wet Compression, http://www.turbineinletcooling.org/resources/papers/CTIC_WetCompression_Shepherd_ASMETurboExpo2011.pdf, 22 pgs.
Cho, J. H. et al. (2005) "Marrying LNG and Power Generation," Energy Markets; 10, 8; ABI/INFORM Trade & Industry, 8 pgs.
Ciulia, Vincent. (2001-2003) "Auto Repair. How the Engine Works," http://autorepair.about.com/cs/generalinfo/a/aa060500a.htm, 1 page.
Clark, Hal (2002) "Development of a Unique Gas Generator for a Non-Polluting Power Plant," California Energy Commission Feasibility Analysis, P500-02-011F, 42 pgs.
Corti, A. et al. (1988) "Athabasca Mineable Oil Sands: The RTR/Gulf Extraction Process Theoretical Model of Bitumen Detachment," $4^{th}$ UNITAR/UNDP Int'l Conf. on Heavy Crude and Tar Sands Proceedings, v.5, paper No. 81, Edmonton, AB, Canada, 4 pgs.
Science Clarified (2012) "Cryogenics," http://www.scienceclarified.com/Co-Di/Cryogenics.html; 6 pgs.
Defrate, L. A. et al. (1959) "Optimum Design of Ejector Using Digital Computers" Chem. Eng. Prog. Symp. Ser., 55 ( 21), 12 pgs.
Ditaranto, M. et al. (2006) "Combustion Instabilities in Sudden Expansion Oxy-Fuel Flames," ScienceDirect, Combustion and Flame, v.146, 19 pgs.
Elwell, L. C. et al. (2005) "Technical Overview of Carbon Dioxide Capture Technologies for Coal-Fired Power Plants," MPR Associates, Inc., www.mpr.com/uploads/news/co2-capture-coal-fired.pdf, 15 pgs.
ElKady, Ahmed M. et al. (2009) "Application of Exhaust Gas Recirculation in a DLN F-Class Combustion System for Postcombustion Carbon Capture," ASME J. Engineering for Gas Turbines and Power, vol. 131, 6 pgs.
Eriksson, Sara. (2005) "Development of Methane Oxidation Catalysts for Different Gas Turbine Combustor Concepts." KTH—The Royal Institute of Technology, Department of Chemical Engineering and Technology, Chemical Technology, Licentiate Thesis, Stockholm Sweden; 45 pgs.
Ertesvag, I. S. et al. (2005) "Exergy Analysis of a Gas-Turbine Combined-Cycle Power Plant With Precombustion $CO_2$ Capture," Elsevier, 34 pgs.
Evulet, Andrei T. et al. (2009) "On the Performance and Operability of GE's Dry Low $NO_x$ Combustors utilizing Exhaust Gas Recirculation for Post-Combustion Carbon Capture" Energy Procedia I, 7 pgs.
Foy, Kirsten et al. (2005) "Comparison of Ion Transport Membranes" Fourth Annual Conference on Carbon Capture and Sequestration, DOE/NETL; 11 pgs.
Luby, P. et al. (2003) "Zero Carbon Power Generation: IGCC as the Premium Option," Powergen International, 19 pgs.
MacAdam, S. et al. (2007) "Coal-Based Oxy-Fuel System Evaluation and Combustor Development," Clean Energy Systems, Inc.; presented at the $2^{nd}$ Int'l Freiberg Conf. on IGCC & XtL Technologies, 6 pgs.
Morehead, H. (2007) "Siemens Global Gasification and IGCC Update," Siemens, Coal-Gen, 17 pgs.
Nanda, R. et al. (2007) "Utilizing Air Based Technologies as Heat Source for LNG Vaporization," presented at the $86^{th}$ Annl. Conv. of the Gas Proc. of America (GPA 2007), , San Antonio, TX; 13 pgs.
Reeves, S. R. (2001) "Geological Sequestration of $CO_2$ in Deep, Unmineable Coalbeds: An Integrated Research and Commercial-Scale Field Demonstration Project," SPE 71749; presented at the 2001 SPE Annual Technical Conference and Exhibition, New Orleans, Louisiana, 10 pgs.
Reeves, S. R. (2003) "Enhanced Coalbed Methane Recovery," Society of Petroleum Engineers 101466-DL; SPE Distinguished Lecture Series, 8 pgs.
Richards, Geo A., et al. (2001) "Advanced Steam Generators," National Energy Technology Lab., Pittsburgh, PA, and Morgantown, WV; NASA Glenn Research Center (US).
Rosetta, M. J. et al. (2006) "Integrating Ambient Air Vaporization Technology with Waste Heat Recovery—A Fresh Approach to LNG Vaporization," presented at the $85^{th}$ annual convention of the Gas Processors of America (GPA 2006),Grapevine, Texas, 22 pgs.
Snarheim, D. et al. (2006) "Control Design for a Gas Turbine Cycle With $CO_2$ Capture Capabilities," Modeling, Identification and Control, vol. 00; presented at the $16^{th}$ IFAC World Congress, Prague, Czech Republic, 10 pgs.
Ulfsnes, R. E. et al. (2003) "Investigation of Physical Properties for $CO_2/H_2O$ Mixtures for use in Semi-Closed $O_2/CO_2$ Gas Turbine Cycle With $CO_2$—Capture," Department of Energy and Process Eng., Norwegian Univ. of Science and Technology, 9 pgs.
van Hemert, P. et al. (2006) "Adsorption of Carbon Dioxide and a Hydrogen-Carbon Dioxide Mixture," Intn'l Coalbed Methane Symposium (Tuscaloosa, AL) Paper 0615, 9 pgs.

(56) References Cited

OTHER PUBLICATIONS

Zhu, J. et al. (2002) "Recovery of Coalbed Methane by Gas Injection," Society of Petroleum Engineers 75255; presented at the 2002 SPE Annual Technical Conference and Exhibition, Tulsa, Oklahoma, 15 pgs.
U.S. Appl. No. 13/596,684, filed Aug. 28, 2012, Slobodyanskiy et al.
U.S. Appl. No. 14/066,579, filed Oct. 29, 2013, Huntington et al.
U.S. Appl. No. 14/066,551, filed Oct. 29, 2013, Minto.
U.S. Appl. No. 14/144,551, filed Dec. 30, 2013, Thatcher et al.
U.S. Appl. No. 14/067,559, filed Oct. 30, 2013, Lucas John Stoia et al.
PCT/RU2013/000162, filed Feb. 28, 2013, General Electric Company.
U.S. Appl. No. 14/067,679, filed Oct. 30, 2013, Elizabeth Angelyn Fadde et al.
U.S. Appl. No. 14/067,714, filed Oct. 30, 2013, Carolyn Ashley Antoniono et al.
U.S. Appl. No. 14/067,726, filed Oct. 30, 2013, Carolyn Ashley Antoniono et al.
U.S. Appl. No. 14/067,731, filed Oct. 30, 2013, Carolyn Ashley Antoniono et al.
U.S. Appl. No. 14/067,739, filed Oct. 30, 2013, Carolyn Ashley Antoniono et al.
U.S. Appl. No. 14/067,797, filed Oct. 31, 2013, Anthony Wayne Krull et al.
U.S. Appl. No. 14/066,488, filed Oct. 29, 2013, Pramod K. Biyani et al.
U.S. Appl. No. 14/135,055, filed Dec. 19, 2013, Pramod K. Biyani et al.
U.S. Appl. No. 14/067,844, filed Oct. 30, 2013, John Farrior Woodall et al.
PCT/US13/036020, filed Apr. 10, 2013, General Electric Company/ExxonMobil Upstream Company.
U.S. Appl. No. 14/067,486, filed Oct. 30, 2013, Huntington et al.
U.S. Appl. No. 14/067,537, filed Oct. 30, 2013, Huntington et al.
U.S. Appl. No. 14/067,552, filed Oct. 30, 2013, Huntington et al.
U.S. Appl. No. 14/067,563, filed Oct. 30, 2013, Huntington et al.
Koh, Dong-Yeun et al. (2012) "Recovery of Methane from Gas Hydrates Intercalated within Natural Sediments Using $CO_2$ and a $CO_2/N_2$ Gas Mixture," *CHEMSUSCHEM*, v. 5, No. 8, Jun. 22, 2012, pp. 1443-1448.
Shin, Kyuchul et al. (2008) "Swapping Phenomena Occurring in Deep-Sea Gas Hydrates," *Energy & Fuels*, v. 22, No. 5, Sep. 2008, pp. 3160-3163.

\* cited by examiner

700

POWER GENERATION AND METHANE RECOVERY FROM METHANE HYDRATES

CROSS REFERENCE TO RELATED APPLICATIONS

This application claims the priority benefit of U.S. Patent Application 61/775,168 filed Mar. 8, 2013 entitled POWER GENERATION AND METHANE RECOVERY FROM METHANE HYDRATES, the entirety of which is incorporated by reference herein.

FIELD

The present disclosure relates generally to the integration of power generation and methane recovery from methane hydrates. More particularly, the present disclosure relates to systems and methods for generating power via a power plant and using an exhaust gas from the power plant to recover methane from methane hydrates.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

A large volume of methane is currently contained in permafrost regions in the form of methane hydrates. In many cases, it may be desirable to recover the methane from the methane hydrates. Several techniques for recovering methane from methane hydrates have been explored. According to one technique, methane is recovered from methane hydrates via thermal stimulation. This may be accomplished by injecting high-temperature water into the hydrate layer through a pipeline. Another technique involves dissociating the methane from the methane hydrates via depressurization using a vacuum device. In addition, another technique involves dissociating the methane from the methane hydrates using inhibitors that cause the methane hydrates to become unstable.

U.S. Pat. No. 7,988,750 to Lee et al. describes a method for recovering methane gas from methane hydrates by adding a gas mixture containing nitrogen and carbon dioxide gases to the methane hydrates. Specifically, the methane within the methane hydrates is reacted with the gas mixture, and the gas mixture replaces the methane within the methane hydrates, thus releasing the methane. Furthermore, the gas mixture containing the nitrogen and carbon dioxide may be a flue gas obtained from a factory. However, the flue gas may include gas components other than nitrogen and carbon dioxide, such as water, sulfur, and a variety of other gas components. Thus, a cleanup apparatus may be used to protect the environment by removing the extra gas components from the flue gas prior to injection of the flue gas into the methane hydrates. In some cases, removing the gas components from the flue gas results in a significant increase in operating cost, thus rendering recovery of the methane from the methane hydrates less profitable.

A conventional gas turbine engine often has a turbine compressor that is mechanically linked to a turbine expander through a shaft. The turbine compressor can be used to compress a flow of air ingested by the turbine compressor. The compressed air is then passed to a combustor. In the combustor, fuel is injected and ignited to create a continuous flame. The high pressure exhaust gases from the flame are flowed into the turbine expander, which generates mechanical energy from the exhaust gas as it expands. The mechanical energy, transferred through the shaft to the turbine compressor, is used to power the compression of the air. Additional mechanical energy is produced, over the amount used to compress the ingested air, and harvested for other purposes, for example, to generate electricity. The flame temperature can exceed the metallurgical limits of the combustor can, so an excess amount of air is often used to provide cooling. However, this arrangement may create a higher amount of pollutants, such as nitrogen oxides (NOxs).

Capturing carbon dioxide from the exhaust gas for other uses may be problematic for a number of reasons. For example, there is a low concentration of carbon dioxide in the exhaust gas of a conventional gas turbine, and a very large volume of gas has to be treated. The exhaust gas may also be at a relatively low pressure, e.g., around 1050 kilopascals (kPa), and a relatively high temperature, e.g., from around 425 degrees Celsius (° C.) to around 700° C. Further, the exhaust gas may contain a large amount of oxygen that may interfere with $CO_2$ extraction or use. Finally, the exhaust gas may be saturated with water from cooling, which can increase a reboiler duty in the $CO_2$ extraction system.

The combustion of fuel within a combustor, e.g., integrated with a gas turbine, can be controlled by monitoring the temperature of the exhaust gas leaving the expander, because temperatures are generally too high in the combustor for existing instrumentation. At full load, typical gas turbines adjust the amount of fuel introduced to a number of combustors in order to reach a desired combustion gas or exhaust gas temperature.

However, controlling the amount of oxidant introduced to the combustor can also be desirable when an objective is to capture carbon dioxide ($CO_2$) from the exhaust gas. Current carbon dioxide capture technology is expensive for several reasons. For example, the low pressure and low concentration of carbon dioxide in an exhaust gas. The carbon dioxide concentration, however, can be significantly increased from about 4% to greater than 10% by operating the combustion process under substantially stoichiometric conditions. Further, a portion of the exhaust gas may be recycled to the combustor as a diluent for cooling the products of combustion instead of air.

The enhanced exhaust gases may be captured for use by other systems, for example, directly from the exhaust of the gas turbine. However, if a gas turbine is being supplied an oxidant from a separate source, it may be more effective to compress the exhaust gas in the turbine compressor of the gas turbine, and recycle the compressed gas to the combustors as a coolant, then capture a high pressure bleed flow during the control of the recycle flow. Numerous studies have examined the concept of recycling a portion of the exhaust gases to the combustor.

For example, U.S. Pat. No. 4,271,664 to Earnest discloses a turbine engine with exhaust gas recirculation. The engine has a main power turbine operating on an open-loop Brayton cycle. The air supply to the main power turbine is furnished by a compressor independently driven by the turbine of a closed-loop Rankine cycle which derives heat energy from the exhaust gas of the Brayton turbine. A portion of the exhaust gas is recirculated into the compressor inlet during part-load operation. However, no additional uses are disclosed for the recycled exhaust gas.

SUMMARY

An exemplary embodiment of the present techniques provides a system for generating power and recovering methane from methane hydrates. The system includes a low emissions power plant configured to generate power, wherein an exhaust gas from the low emissions power plant provides a gas mixture including nitrogen and carbon dioxide. The system also includes a methane recovery system configured to recover methane from methane hydrates by injecting the nitrogen and the carbon dioxide from the gas mixture into the methane hydrates.

Another exemplary embodiment provides a method for generating power and recovering methane from methane hydrates. The method includes producing power via a low emissions power plant, wherein an exhaust gas from the low emissions power plant provides a gas mixture including nitrogen and carbon dioxide. The method also includes recovering methane from methane hydrates by injecting the nitrogen and the carbon dioxide from the gas mixture into the methane hydrates.

Another exemplary embodiment provides a system for recovering methane from methane hydrates using a gas mixture from a combined cycle power plant. The system includes an expander turbine configured to provide mechanical energy by extracting energy from a gas mixture exiting a combustor, wherein the gas mixture including nitrogen and carbon dioxide. The system also includes a heat recovery steam generator (HRSG) configured to generate steam by heating a boiler with the gas mixture from the expander turbine, a steam turbine configured to provide mechanical energy by extracting energy from the steam generated by the HRSG, and a generator configured to generate electricity from the mechanical energy provided by the expander turbine and the steam turbine. The system further includes a separation system configured to separate the carbon dioxide from the methane within the gas mixture and a methane recovery system configured to recover methane from methane hydrates by injecting the nitrogen and the carbon dioxide from the gas mixture into the methane hydrates. At least a portion of the methane recovered from the methane hydrates is flowed into the combustor as fuel.

BRIEF DESCRIPTION OF THE DRAWINGS

The advantages of the present techniques are better understood by referring to the following detailed description and the attached drawings, in which.

DETAILED DESCRIPTION

Figure 1:
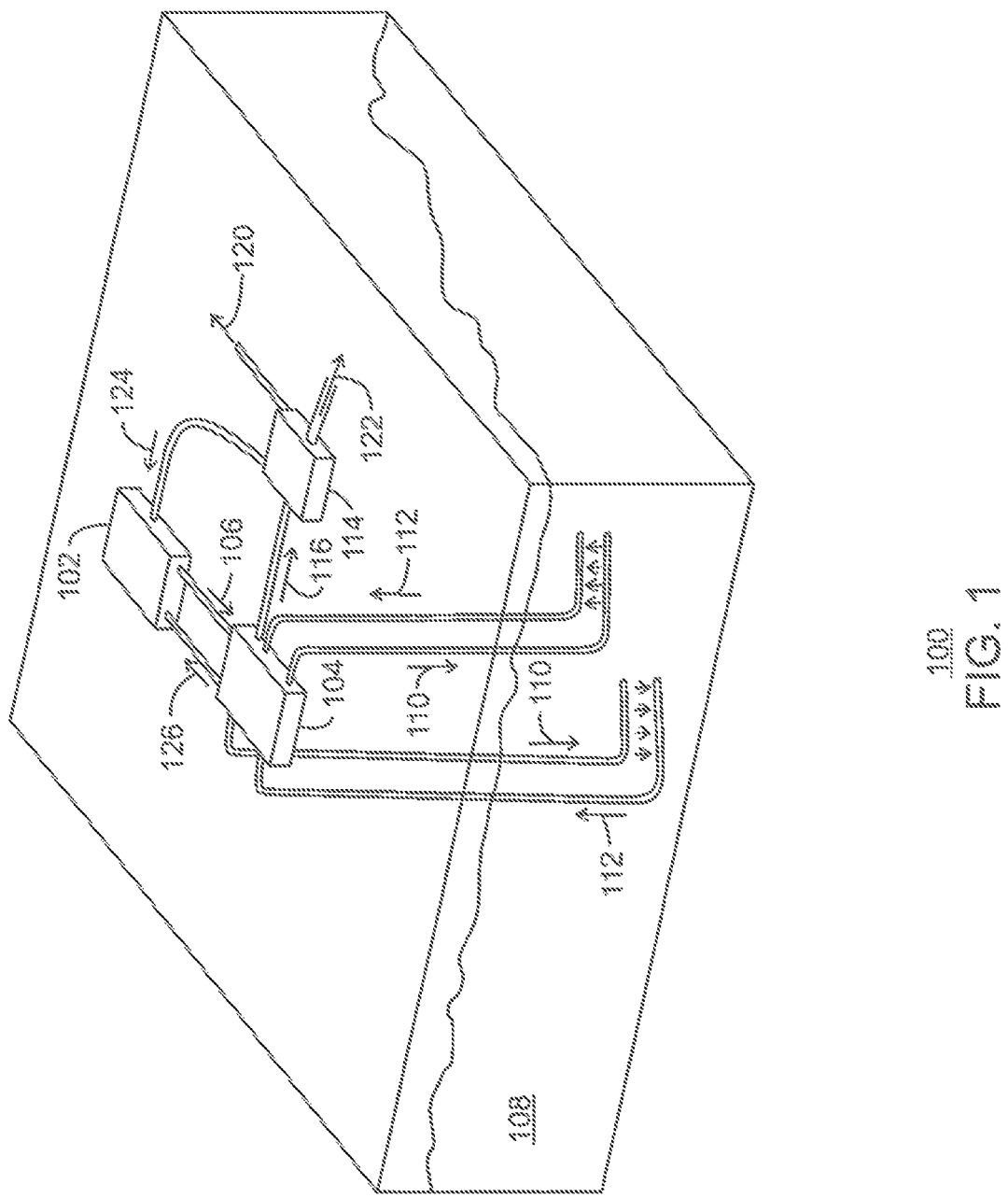
FIG. 1 is a schematic of a development for generating power and recovering methane from methane hydrates.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described herein, but rather, include all alternatives, modifications, and equivalents falling within the true spirit and scope of the appended claims.

At the outset, for ease of reference, certain terms used in this application and their meanings as used in this context are set forth. To the extent a term used herein is not defined herein, it should be given the broadest definition persons in the pertinent art have given that term as reflected in at least one printed publication or issued patent. Further, the present techniques are not limited by the usage of the terms shown herein, as all equivalents, synonyms, new developments, and terms or techniques that serve the same or a similar purpose are considered to be within the scope of the present claims.

A "combined cycle power plant" is generally the combination of an open Brayton Cycle and a Rankine cycle. Combined cycle power plants typically use both steam and gas turbines to generate power, although other working fluids besides water and steam may be used in the Rankine cycle. The combined cycle gas/steam power plants generally have a higher energy conversion efficiency than gas or steam only plants. A combined cycle plant's efficiencies can be as high as 50% to 60% of a lower heating value (LHV). The higher combined cycle efficiencies result from synergistic utilization of a combination of the gas turbine with the steam turbine. Typically, combined cycle power plants utilize heat from the gas turbine exhaust to boil water to generate steam. The boilers in typical combined cycle plants can be referred to as heat recovery steam generator (HRSG). The steam generated is utilized to power a steam turbine in the combined cycle plant. The gas turbine and the steam turbine can be utilized to separately power independent generators, or in the alternative, the steam turbine can be combined with the gas turbine to jointly drive a single generator via a common drive shaft.

As used herein, a "compressor" includes any type of equipment designed to increase the pressure of a fluid or working fluid, and includes any one type or combination of similar or different types of compression equipment. A compressor may also include auxiliary equipment associated with the compressor, such as motors, and drive systems, among others. The compressor may utilize one or more compression stages, for example, in series. Illustrative compressors may include, but are not limited to, positive displacement types, such as reciprocating and rotary compressors for example, and dynamic types, such as centrifugal and axial flow compressors, for example. For example, a compressor may be a first stage in a gas turbine engine, as discussed in further detail herein.

As used herein, "cooling" broadly refers to lowering and/or dropping a temperature and/or internal energy of a substance, such as by any suitable amount. Cooling may include a temperature drop of at least about 1 degree Celsius (° C.), at least about 5° C., at least about 10° C., at least about 15° C., at least about 25° C., at least about 50° C., at least about 100° C., and/or the like. The cooling may use any suitable heat sink, such as steam generation, hot water heating, cooling water, air, refrigerant, other process streams (integration), and combinations thereof. One or more sources of cooling may be combined and/or cascaded to reach a desired outlet temperature. The cooling step may use a cooling unit with any suitable device and/or equipment. According to one embodiment, cooling may include indirect heat exchange, such as with one or more heat exchangers. Heat exchangers may include any suitable design, such as shell and tube, plate and frame, counter current, concurrent, extended surface, and/or the like. In the alternative, the cooling may use evaporative (heat of vaporization) cooling and/or direct heat exchange, such as a liquid sprayed directly into a process stream.

"Cryogenic temperature" refers to a temperature that is about −50° C. or below.

A "diluent" is a gas used to lower the concentration of oxidant fed to a gas turbine to combust a fuel. The diluent may be an excess of nitrogen, carbon dioxide, combustion exhaust, or any number of other gases. In embodiments, the diluent may also provide cooling to a combustor.

An "equivalence ratio" refers to the mass ratio of fuel to oxygen entering a combustor divided by the mass ratio of fuel to oxygen when the ratio is stoichiometric. A perfect combustion of fuel and oxygen to form carbon dioxide and water would have an equivalence ratio of 1. A too lean mixture, e.g., having more oxygen than fuel, would provide an equivalence ratio less than 1, while a too rich mixture, e.g., having more fuel than oxygen, would provide an equivalence ratio greater than 1.

"Exemplary" is used exclusively herein to mean "serving as an example, instance, or illustration." Any embodiment described herein as "exemplary" is not to be construed as preferred or advantageous over other embodiments.

A "formation" is any finite subsurface region. The formation may contain one or more hydrocarbon-containing layers, one or more non-hydrocarbon containing layers, an overburden, and/or an underburden of any subsurface geologic formation. An "overburden" and/or an "underburden" is geological material above or below the formation of interest.

A "fuel" includes any number of hydrocarbons that may be combusted with an oxidant to power a gas turbine. Such hydrocarbons may include natural gas, treated natural gas, kerosene, gasoline, or any number of other natural or synthetic hydrocarbons. In one embodiment, natural gas from an oil field is purified and used to power the turbine. In another embodiment, a reformed gas, for example, created by processing a hydrocarbon in a steam reforming process may be used to power the turbine.

The term "gas" is used interchangeably with "vapor," and is defined as a substance or mixture of substances in the gaseous state as distinguished from the liquid or solid state. Likewise, the term "liquid" means a substance or mixture of substances in the liquid state as distinguished from the gas or solid state.

A "gas turbine engine" operates on the Brayton cycle. If the exhaust gas is vented to the atmosphere, this is termed an open Brayton cycle, while recycling of the exhaust gas gives a closed Brayton cycle. As used herein, a "gas turbine" typically includes a compressor section, a number of combustors, and an expander turbine section. The compressor may be used to compress an oxidant, which is mixed with a fuel and channeled to the combustors. The mixture of fuel and oxidant is then ignited to generate hot combustion gases. The combustion gases are channeled to the expander turbine section which extracts energy from the combustion gases for powering the compressor, as well as producing useful work to power a load. In embodiments discussed herein, the oxidant may be provided to the combustors by an external compressor, which may or may not be mechanically linked to the shaft of the gas turbine engine. Further, in embodiments, the compressor section may be used to compress a diluent, such as recycled exhaust gases, which may be fed to the combustors as a coolant.

A "heat exchanger" broadly means any device capable of transferring heat from one media to another media, including particularly any structure, e.g., device commonly referred to as a heat exchanger. Heat exchangers include "direct heat exchangers" and "indirect heat exchangers." Thus, a heat exchanger may be a plate-and-frame, shell-and-tube, spiral, hairpin, core, core-and-kettle, double-pipe or any other type of known heat exchanger. "Heat exchanger" may also refer to any column, tower, unit or other arrangement adapted to allow the passage of one or more streams therethrough, and to affect direct or indirect heat exchange between one or more lines of refrigerant, and one or more feed streams.

A "heat recovery steam generator" or "HRSG" is a heat exchanger or boiler that recovers heat from a hot gas stream. It produces steam that can be used in a process or used to drive a steam turbine. A common application for an HRSG is in a combined-cycle power plant, where hot exhaust from a gas turbine is fed to the HRSG to generate steam which in turn drives a steam turbine. This combination produces electricity more efficiently than either the gas turbine or steam turbine alone.

As used herein, a "hydrate" is a composite made of a host compound that forms a basic framework and a guest compound that is held in the host framework by inter-molecular interaction, such as hydrogen bonding, Van der Waals forces, and the like. Hydrates may also be called host-guest complexes, inclusion compounds, and adducts. As used herein, "clathrate," "clathrate hydrate," and "hydrate" are interchangeable terms used to indicate a hydrate having a basic framework made from water as the host compound. A hydrate is a crystalline solid which looks like ice and forms when water molecules form a cage-like structure around a "hydrate-forming constituent."

A "hydrate-forming constituent" refers to a compound or molecule in petroleum fluids, including natural gas, that forms hydrate at elevated pressures and/or reduced temperatures. Illustrative hydrate-forming constituents include, but are not limited to, hydrocarbons such as methane, ethane, propane, butane, neopentane, ethylene, propylene, isobutylene, cyclopropane, cyclobutane, cyclopentane, cyclohexane, and benzene, among others. Hydrate-forming constituents can also include non-hydrocarbons, such as oxygen, nitrogen, hydrogen sulfide, carbon dioxide, sulfur dioxide, and chlorine, among others. According to embodiments described herein, a hydrate that is formed from methane is referred to as a "methane hydrate." Methane hydrates may occur frequently in permafrost regions, such as in the Arctic, for example.

A "hydrocarbon" is an organic compound that primarily includes the elements hydrogen and carbon, although nitrogen, sulfur, oxygen, metals, or any number of other elements may be present in small amounts. As used herein, hydrocarbons generally refer to components found in raw natural gas, such as $CH_4$, $C_2H_2$, $C_2H_4$, $C_2H_6$, $C_3$ isomers, $C_4$ isomers, benzene, and the like.

"Natural gas" refers to a multi-component gas obtained from a crude oil well or from a subterranean gas-bearing formation. The composition and pressure of natural gas can vary significantly. A typical natural gas stream contains methane ($CH_4$) as a major component, i.e., greater than 50 mol % of the natural gas stream is methane. The natural gas stream can also contain ethane ($C_2H_6$), higher molecular weight hydrocarbons (e.g., $C_3$-$C_{20}$ hydrocarbons), one or more acid gases (e.g., carbon dioxide or hydrogen sulfide), or any combinations thereof The natural gas can also contain minor amounts of contaminants such as water, nitrogen, iron sulfide, wax, crude oil, or any combinations thereof The natural gas stream may be substantially purified prior to use in embodiments, so as to remove compounds that may act as poisons.

An "oxidant" is a gas mixture that can be flowed into the combustors of a gas turbine engine to combust a fuel. As used herein, the oxidant may be oxygen mixed with any number of other gases as diluents, including carbon dioxide ($CO_2$), nitrogen ($N_2$), air, combustion exhaust, and the like. Other gases that function as oxidizers may be present in the oxidant mixture in addition to oxygen, including ozone, hydrogen peroxide, NOxs, and the like.

"Pressure" is the force exerted per unit area by the gas on the walls of the volume.

Pressure can be shown as pounds per square inch (psi). "Atmospheric pressure" refers to the local pressure of the air. "Absolute pressure" (psia) refers to the sum of the atmospheric pressure (14.7 psia at standard conditions) plus the gage pressure (psig). "Gauge pressure" (psig) refers to the pressure measured by a gauge, which indicates only the pressure exceeding the local atmospheric pressure (i.e., a gauge pressure of 0 psig corresponds to an absolute pressure of 14.7 psia). The term "vapor pressure" has the usual thermodynamic meaning. For a pure component in an enclosed system at a given pressure, the component vapor pressure is essentially equal to the total pressure in the system.

The term "permafrost" refers to perennially frozen ground, i.e., a naturally occurring material that is at a temperature colder than 0° C. continuously for an extended period of time. Such a layer of frozen ground is designated exclusively on the basis of temperature. Part or all of its moisture may be unfrozen, depending on the chemical composition of the water or the depression of the freezing point by capillary forces. Most permafrost, however, is consolidated by ice. In addition to water, permafrost can store any number of other substances. For example, permafrost can store methane and/or carbon dioxide in the form of hydrates. Permafrost forms and exists in a climate where the mean annual air temperature is 0° C. or colder. Such a climate is generally characterized by long, cold winters and short, relatively dry, cool summers. Permafrost, therefore, is widespread in the Arctic, sub-Arctic, and Antarctica.

"Substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context.

Overview

Embodiments described herein provide a system and method for the integration of low emissions power generation with the recovery of methane from methane hydrates. According to such embodiments, a gas mixture including $N_2$ and $CO_2$ is generated from a low emissions power plant during the generation of power. The gas mixture is used to recover methane trapped in methane hydrates in permafrost regions, for example. In some embodiments, the recovered methane is then used as fuel for the low emissions power plant, thus providing an integrated power generation and methane recovery system.

Systems for Power Generation and Methane Recovery from Methane Hydrates

FIG. 1 is a schematic of a development 100 for generating power and recovering methane from methane hydrates. In various embodiments, the development 100 is located in a permafrost region, such as the Arctic or sub-Arctic, for example. The development 100 includes a low emissions power plant 102 that is integrated with a methane recovery system 104.

The low emissions power plant 102 may be a semi-closed Brayton cycle power plant, or a combined cycle power plant that includes both a semi-closed Brayton cycle and a Rankine cycle. If the low emissions power plant 102 is a combined cycle power plant, the exhaust stream from the expander turbine of the semi-closed Brayton cycle can be used to boil water or other heat transfer fluids in a heat recovery steam generator (HRSG) that can be used to power the Rankine cycle power plant. In the Rankine cycle power plant, the steam or other vapor can be used to drive a turbine and generate more electricity.

According to embodiments described herein, an exhaust gas from the low emissions power plant 102 provides a gas mixture including mostly $N_2$ and $CO_2$. The gas mixture from the low emissions power plant 102 is provided to the methane recovery system 104, as indicated by arrow 106.

The methane recovery system 104 includes an injection system for injecting the gas mixture into a methane hydrate formation 108, as indicated by arrows 110. In various embodiments, injecting the gas mixture into the methane hydrate formation 108 results in the release of the methane from the methane hydrates. Specifically, the carbon dioxide within the gas mixture replaces the methane within the methane hydrates. In addition, the nitrogen within the gas mixture aids in the release of the methane from the methane hydrates by increasing the temperature of the methane hydrates. The released methane is then flowed back to the methane recovery system 104, as indicated by arrows 112.

In some embodiments, the methane recovery system 104 also includes a separation system for separating the gas mixture into a carbon dioxide stream and a nitrogen stream. The carbon dioxide stream and the nitrogen stream may then be separately injected into the methane hydrate formation 108.

The methane that is recovered via the methane recovery system 104 may include some amount of impurities, such as soil or water from the methane hydrate formation 108 or surrounding permafrost . Therefore, the methane may be flowed to a separation facility 114, as indicated by arrow 116. The separation facility 114 may remove the impurities from the methane and send the impurities to another destination, such as a tailings pond, for example, as indicated by arrow 118. The purified methane may then be offloaded as the final methane product, as indicated by arrow 120.

In various embodiments, a portion of the purified methane may be sent from the separation facility 114 to the low emissions power plant 102, as indicated by arrow 122. The methane may then be used as fuel for the gas turbine engine of the low emissions power plant 102. Furthermore, in some embodiments, the methane recovered via the methane recovery system 104 is substantially pure and may be used as fuel for the gas turbine engine of the low emissions power plant 102 without being purified within the separation facility 114. In such embodiments, the recovered methane may be flowed directly from the methane recovery system 104 to the low emissions power plant 102, as indicated by arrow 124.

The block diagram of FIG. 1 is not intended to indicate that the development 100 is to include all of the components shown in FIG. 1. Moreover, the development 100 may include any number of additional components not shown in FIG. 1, depending on the details of the specific implementation.

Figure 2:
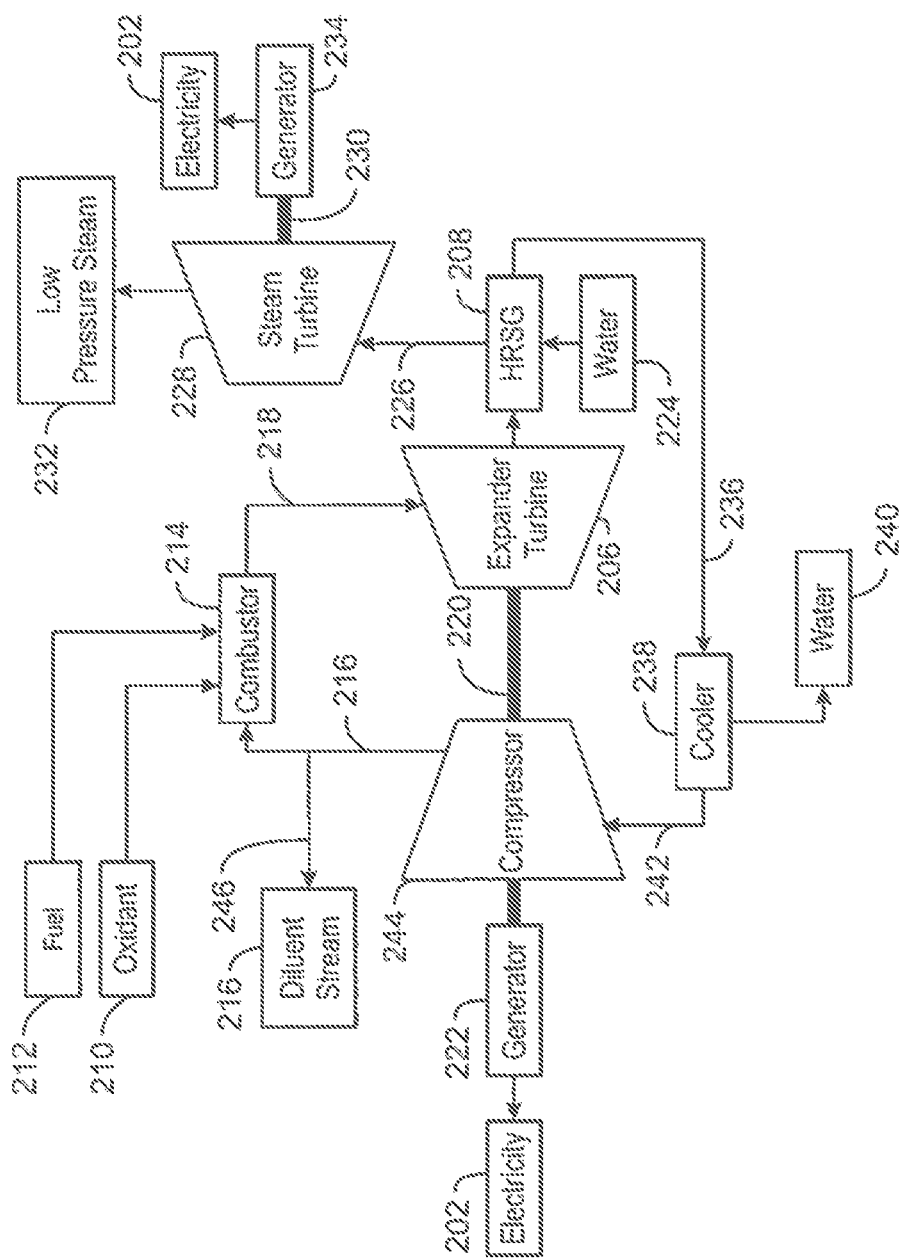
FIG. 2 is a process flow diagram of a combined cycle power plant that can be used to produce electricity and generate a diluent gas mixture including nitrogen ($N_2$) and carbon dioxide ($CO_2$)

FIG. 2 is a process flow diagram of a combined cycle power plant 200 that can be used to produce electricity 202 and generate a diluent gas mixture including $N_2$ and $CO_2$. In various embodiments, the combined cycle power plant 200 is implemented within the development 100 as the low emissions power plant 102. Further, in various embodiments, the combined cycle power plant 200 includes a semi-closed Brayton cycle including, for example, an expander turbine 206, and a Rankine cycle including, for example, a HRSG 208.

Within the combined cycle power plant 200, oxidant 210 and fuel gas 212 are fed to a combustor 214 to be burned. A compressed diluent stream 216 is also fed to the combustor 214 to lower the total amount of fuel gas 212 and oxidant 210, which allows the combustion process to be run at near stoichiometric conditions without overheating the combustor 214 or the expander turbine 206. As a result, the amount of $O_2$ and CO generated in the combustion process is decreased, and hot exhaust gas 218 exiting the combustor includes mostly $CO_2$, $H_2O$, and $N_2$, in addition to some trace gases, such as CO and NOx.

The oxidant 210 and fuel gas 212 pressures may be increased, for example, using compressors, to boost the pressure to match the injection pressure of the compressed diluent stream 216 at the combustor 214. The hot exhaust gas 218 from the combustor 214 is flowed to the expander turbine 206, which uses the energy of the hot exhaust gas 218 to spin a shaft 220. The shaft 220 provides mechanical energy to the compressor turbine 224, completing the Brayton cycle. The shaft 220 may also provide mechanical energy to an electric generator 222 to generate electricity 202. The electric generator 222 may be directly coupled to the shaft 220 from the expander turbine 206, or may be coupled to the shaft 220 by a gear box, clutch, or other device.

From the expander turbine 206, the hot exhaust gas 218 is flowed to the HRSG 208. The HRSG 208 may boil a water stream 224 with the energy from the hot exhaust gas 218 to generate steam 226. The steam 226 that is generated can be used to drive a steam turbine 228 and spin a shaft 230. After exiting the steam turbine 228, the resulting low pressure steam 232 can be cooled and condensed, to be used as the water stream 224 to feed the HRSG 208.

The shaft 230 from the steam turbine 228 can provide mechanical energy to an electric generator 234 to generate electricity 202, or may be used power other devices, such as compressors. The electric generator 234 may be directly coupled to the shaft 230 from the steam turbine 228, or may be coupled to the shaft 230 by a gear box, clutch, or other device. Further, in the embodiment shown in FIG. 2, the expander turbine 206 and the steam turbine 228 are coupled to separate electric generators 222 and 234. However, it is to be understood that the expander turbine 206 and the steam turbine 228 may also be coupled, directly or indirectly, to one common electric generator.

The hot gas stream 236 exiting the HRSG 208 is flowed to a cooler 238. The cooler 238 chills the hot gas stream 236, causing the water vapor formed in the combustion process to condense out, allowing its removal as a separate water stream 240. After removal of the water stream 240, the chilled gas mixture 242 is provided to a compressor 244 for recompression, prior to feeding the compressed diluent stream 216 to the combustor 214 to aid in cooling the combustor 214. The recycling of the hot gas stream 236 as the diluent stream 216 partially closes the Brayton cycle in the combined cycle power plant 200, resulting in a semi-closed Brayton cycle.

As the fuel gas 212 and the oxidant 210 are continuously being fed to the combined cycle power plant 200 to maintain the combustion, a portion 246 of the diluent stream 216 is continuously removed. The diluent stream 216 may include mostly $N_2$ and $CO_2$. According to embodiments described herein, the diluent stream 216 exiting the combined cycle power plant 200 is used to recover methane from methane hydrates, as discussed further herein.

The process flow diagram of FIG. 2 is not intended to indicate that the combined cycle power plant 200 is to include all of the components shown in FIG. 2. Moreover, the combined cycle power plant 200 may include any number of additional components not shown in FIG. 2, depending on the details of the specific implementation.

Figure 3:
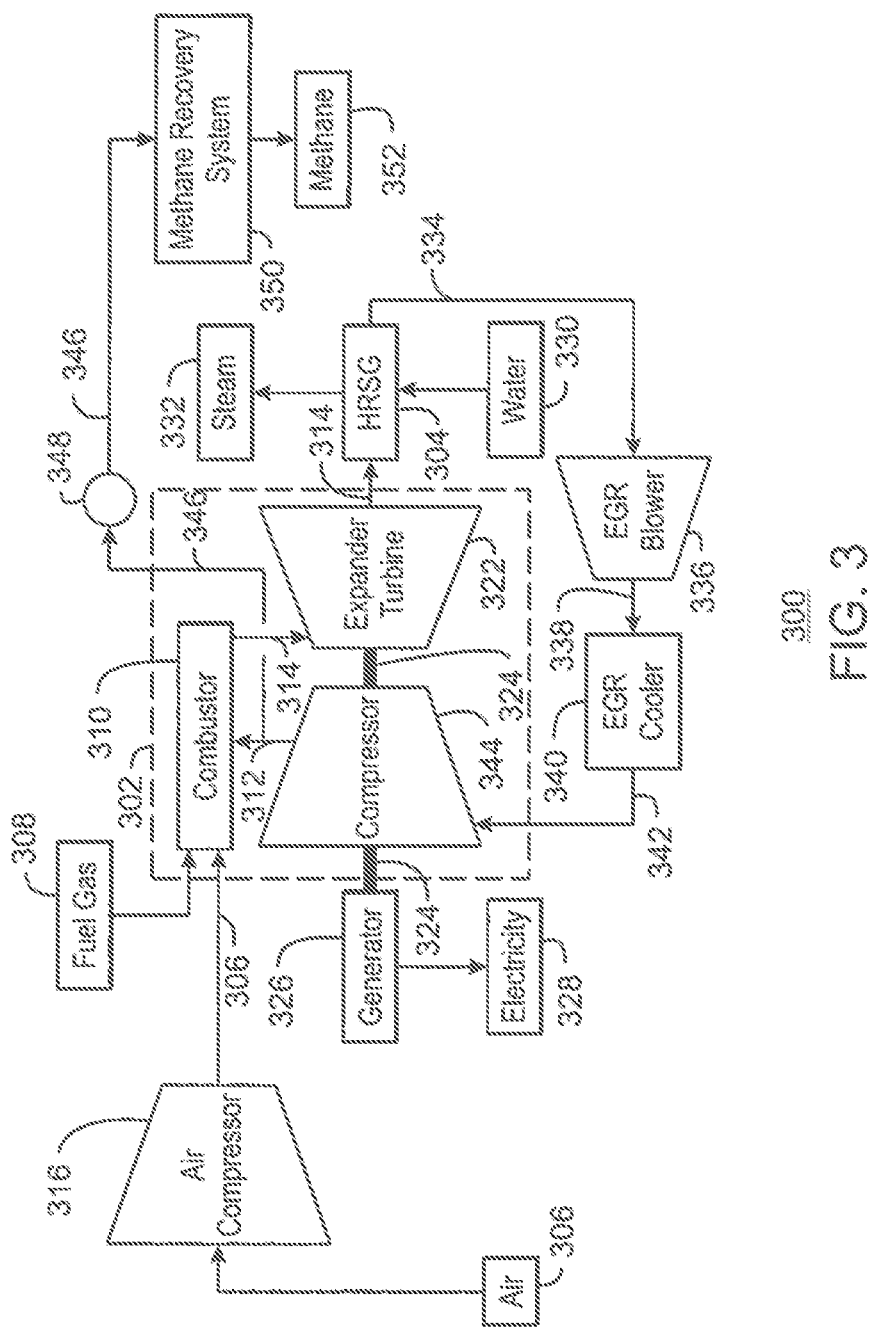
FIG. 3 is a process flow diagram of a system for integrating low emissions power generation with methane recovery from methane hydrates.

FIG. 3 is a process flow diagram of a system 300 for integrating low emissions power generation with methane recovery from methane hydrates. In various embodiments, the system 300 is implemented within the development 100 as the low emissions power plant 102 and the methane recovery system 104. The system 300 provides for low emissions power generation using a combined cycle power plant including a semi-closed Brayton cycle that utilizes a gas turbine engine 302 and a Rankine cycle that utilizes an HRSG 304. In addition, the system 300 provides for methane recovery from methane hydrates by using exhaust gas from the combined cycle power plant to release the methane from the methane hydrates.

As shown in FIG. 3, air 306 and fuel gas 308 are fed to a combustor 310 to be burned within the semi-closed Brayton cycle. While air 306 is used as the oxidant in the embodiment shown in FIG. 3, it is to be understood that any other suitable type of oxidant may also be used in conjunction with the system 300.

A compressed diluent stream 312 is also fed to the combustor 310 to lower the total amount of air 306 and fuel gas 308 that is utilized for the combustion process. This may allow the combustion process to be run at near stoichiometric conditions without overheating. As a result, the amount of $O_2$ and CO generated in the combustion process is decreased, and hot exhaust gas 314 exiting the combustor includes mostly $CO_2$, $H_2O$, and $N_2$, in addition to some trace gases.

The air 306 and fuel gas 308 pressures may be increased, for example, using compressors, to boost the pressure to match the injection pressure of the compressed diluent stream 312 at the combustor 310. For example, according to the embodiment shown in FIG. 3, the air 306 is compressed within an air compressor 316. In addition, the air compressor 316 may include one or more stages of compression, and may include one or more intercoolers to reduce the temperature of the air between stages. Furthermore, when more than one stage of compression is included, the individual stages may or may not be configured in a common casing or driven by a common shaft or other driving means. The compressed air 306 is then fed into the combustor 310 to be burned.

The hot exhaust gas 314 from the combustor 310 is flowed to an expander turbine 322 of the gas turbine engine 302, which uses the energy of the hot exhaust gas 314 to spin a shaft 324. The shaft 324 provides mechanical energy to an electric generator 326 to generate electricity 328. The electric generator 326 may be directly coupled to the shaft 324 from the expander turbine 322, or may be coupled to the shaft 324 by a gear box, clutch, or other device.

From the expander turbine 322, the hot exhaust gas 314 is flowed to the HRSG 304 within the Rankine cycle of the combined cycle power plant. The HRSG 304 boils a water stream 330 to generate steam 332 with the energy from the hot exhaust gas 314. In various embodiments, the generated steam 332 is used to drive the steam turbine, which uses the energy of the steam 332 to spin a shaft. The shaft may provide mechanical energy to an electric generator to generate additional electricity.

The hot gas stream 334 exiting the HRSG 304 is flowed to an exhaust gas recirculation (EGR) blower 336. The EGR blower 336 compresses the hot gas stream 334 and feeds the resulting compressed gas stream 338 into an EGR cooler 340. The EGR cooler 340 chills the compressed gas stream 338, producing a diluent stream 342. Cooling the hot gas stream 334 may also condense out water, drying the diluent stream 342.

The diluent stream 342 is then fed into a compressor 344. The compressor 344 compresses the diluent stream 342, producing the compressed diluent stream 312. In the embodiment shown in FIG. 3, the compressor 344 is coupled to the shaft 324, and the mechanical energy provided by the spinning of the shaft 324 is used to drive the compressor 344.

From the compressor 344, the compressed diluent stream 312 is fed to the combustor 310 to aid in cooling the combustor 310. The recycling of the hot gas stream 334 as the compressed diluent stream 312 partially closes the Brayton cycle in the combined cycle power plant, resulting in the semi-closed Brayton cycle.

As the air 306 and the fuel gas 308 are continuously being fed to the combustor 310 to maintain the combustion process, at least a portion of the compressed diluent stream 312 is continuously removed. For example, a portion of the diluent stream 312 may be removed as a gas mixture 346 including mostly $N_2$ and $CO_2$.

According to embodiments described herein, the gas mixture 346 may be extracted from the combustor 310 after it has been burned and used to drive the expander turbine 322. For example, the gas mixture 346 may be extracted from the expander turbine 322 at about 2206 kilopascals (kPa) and 427° C. The gas mixture 346 is then cooled using a cooler 348 and, optionally, used to generate steam 332 within the HRSG 304.

After the gas mixture 346 has been cooled within the cooler 348, the gas mixture 346 is flowed into a methane recovery system 350. The methane recovery system 350 includes an injection system for injecting the gas mixture 346 into a methane hydrate formation. As the gas mixture 346 is injected into the methane hydrate formation, the gas mixture 346 allows the methane 352 to be released from the methane hydrates and recovered via the methane recovery system 350.

Specifically, in some embodiments, the gas mixture 346 is injected into the methane hydrate formation at a pressure that is lower than the hydrate formation pressure of the gas mixture 346. In such embodiments, because the gas mixture 346 has a higher hydrate formation pressure than methane, the gas mixture 346 increases the temperature of the methane hydrates, allowing the methane 352 to escape from the methane hydrates. In other embodiments, the gas mixture 346 is injected into the methane hydrate formation at a pressure that is higher than the hydrate formation pressure of the gas mixture 346. In such embodiments, because carbon dioxide has a lower hydrate formation pressure than methane, the carbon dioxide within the gas mixture 346 preferentially replaces the methane 352 within the methane hydrates, causing the methane 352 to dissociate from the methane hydrate formation.

The released methane 352 is then pumped to the surface via the methane recovery system 350. In various embodiments, the methane 352 is exported from the system 300 as the final methane product. Further, in some embodiments, at least a portion of the methane 352 is used as the fuel gas 308 for the gas turbine engine 302.

The process flow diagram of FIG. 3 is not intended to indicate that the system 300 is to include all of the components shown in FIG. 3. Moreover, the system 300 may include any number of additional components not shown in FIG. 3, depending on the details of the specific implementation.

In various embodiments, the gas mixture 346 exiting the combined cycle power plant of the system 300 FIG. 3 includes about 89% nitrogen and 11% carbon dioxide. In some cases, it may be desirable to adjust the ratio of nitrogen to carbon dioxide within the gas mixture 346 prior to injecting the gas mixture into the methane hydrate formation, as discussed with respect to FIG. 4.

Figure 4:
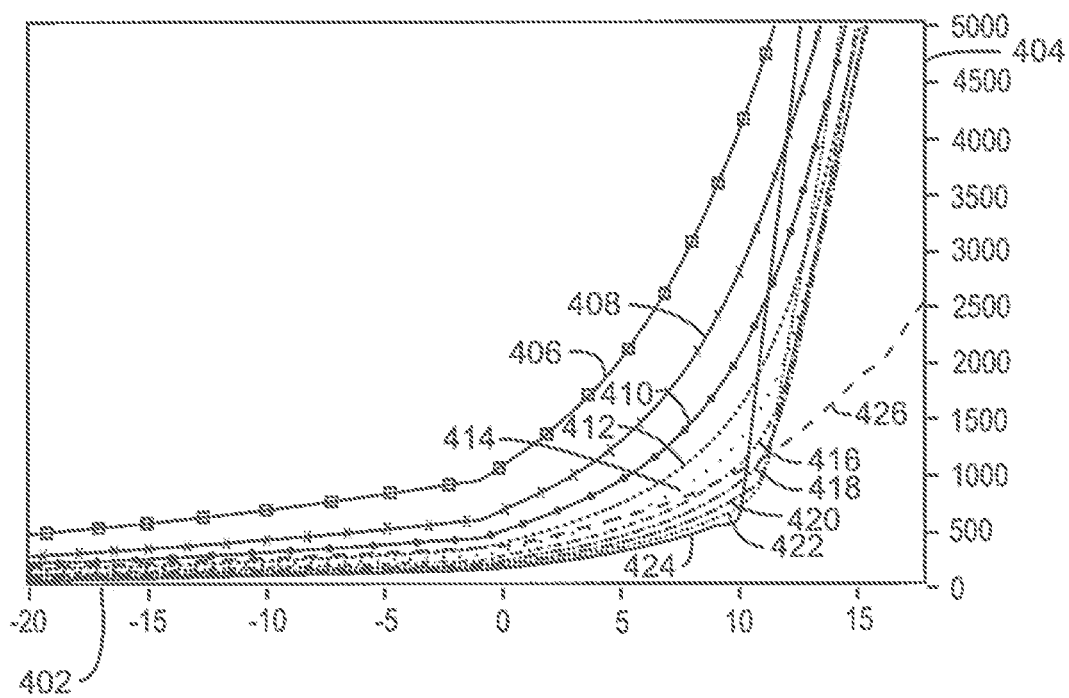
FIG. 4 is a graph showing $N_2/CO_2$ hydrate formation curves as a function of temperature, pressure, and nitrogen mole fraction.

FIG. 4 is a graph 400 showing $N_2/CO_2$ hydrate formation curves as a function of temperature, pressure, and nitrogen mole fraction. An x-axis 402 of the graph 400 represents temperature in degrees Celsius (° C.), where the temperature values range from −20° C. to 15° C. A y-axis 404 of the graph 400 represents pressure in pounds per square inch absolute (psia), where the pressure values range from 0 psi (0 kPa) to 5,000 psi (34,474 kPa).

Each hydrate formation curve shown in FIG. 4 represents the hydrate formation characteristics of the gas mixture 346 at a specific nitrogen mole fraction. The nitrogen mole fraction is the moles of nitrogen within the gas mixture 346 divided by the sum of the moles of nitrogen and carbon dioxide within the gas mixture 346, i.e., the total moles of gas. Hydrate formation curve 406 represents a nitrogen mole fraction of 0.9. Hydrate formation curve 408 represents a nitrogen mole fraction of 0.8. Hydrate formation curve 410 represents a nitrogen mole fraction of 0.7. Hydrate formation curve 412 represents a nitrogen mole fraction of 0.6. Hydrate formation curve 414 represents a nitrogen mole fraction of 0.5. Hydrate formation curve 416 represents a nitrogen mole fraction of 0.4. Hydrate formation curve 418 represents a nitrogen mole fraction of 0.3. Hydrate formation curve 420 represents a nitrogen mole fraction of 0.2. Hydrate formation curve 422 represents a nitrogen mole fraction of 0.1, and hydrate formation curve 424 represents a nitrogen mole fraction of 0. By comparison, hydrate formation curve 426 represents pure methane.

As shown in FIG. 4, adjusting the nitrogen mole fraction of the gas mixture 346 allows for an adjustment of the hydrate formation characteristics of the gas mixture 346 in comparison to the hydrate formation characteristics of methane. The hydrate formation pressure of nitrogen is higher than the hydrate formation pressure of methane, while the hydrate formation pressure of carbon dioxide is lower than the hydrate formation pressure of methane. Moreover, it may be desirable for the hydrate formation pressure of the gas mixture 346 to be either above or below the hydrate formation pressure of methane, depending on the details of the specific implementation. Therefore, the nitrogen mole fraction of the gas mixture 346 may be increased or decreased based on the desired hydrate formation pressure of the gas mixture 346.

Figure 5:
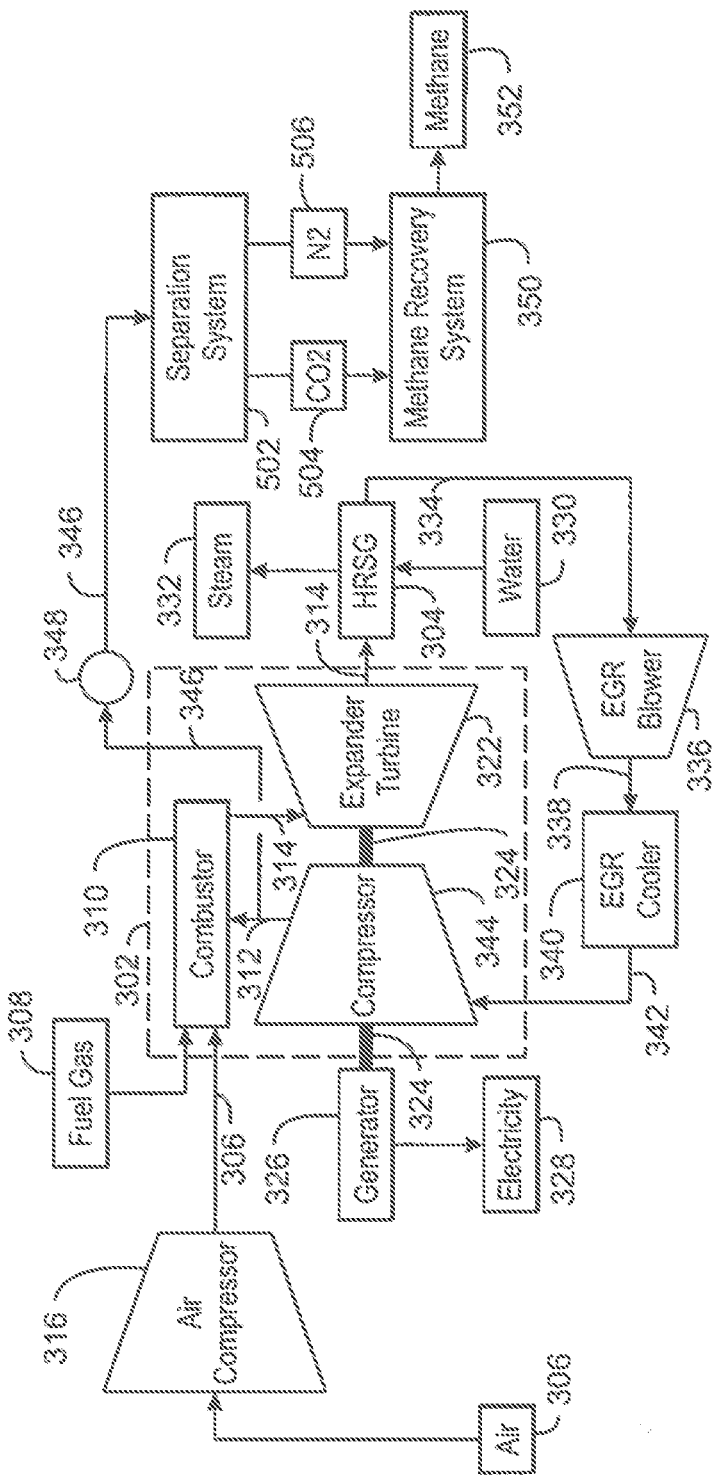
FIG. 5 is a process flow diagram of another system for integrating low emissions power generation with methane recovery from methane hydrates.

FIG. 5 is a process flow diagram of another system 500 for integrating low emissions power generation with methane recovery from methane hydrates. Like numbered items are as described with respect to the system 300 of FIG. 3. The system 500 of FIG. 5 is similar to the system 300 of FIG. 3. However, according to the system 500 of FIG. 5, the carbon dioxide and nitrogen within the gas mixture 346 are injected into the methane hydrate formation separately.

According to the system 500 of FIG. 5, after the gas mixture 346 has been cooled within the cooler 348, the gas mixture 346 is flowed into a separation system 502. The separation system 502 separates the carbon dioxide 504 from the nitrogen 506 within the gas mixture 346. In some embodiments, the separation system 502 accomplishes this via a $CO_2$ separation process, such as an amine separation process or a potassium carbonate separation process, for example.

The carbon dioxide 504 and the nitrogen 506 may then be flowed into the methane recovery system 350 as separate streams. The methane recovery system 350 may include an injection system for separately injecting the carbon dioxide 504 and the nitrogen 506 into the methane hydrate formation, or may blend the two streams 504 and 506 to a target concentration. As the carbon dioxide 504 and the nitrogen 506 are injected into the methane hydrate formation, the carbon dioxide 504 and the nitrogen 506 allow the methane 352 to be released from the methane hydrates and recovered via the methane recovery system 350. Specifically, because nitrogen has a higher hydrate formation pressure than methane, the nitrogen 506 increases the temperature of the methane hydrates, allowing the methane 352 to escape from the methane hydrates more easily. In addition, because carbon dioxide has a lower hydrate formation pressure than methane, the carbon dioxide 504 preferentially replaces the methane 352 within the methane hydrates, causing the methane 352 to dissociate from the methane hydrates.

The process flow diagram of FIG. 5 is not intended to indicate that the system 500 is to include all of the components shown in FIG. 5. Moreover, the system 500 may include any number of additional components not shown in FIG. 5, depending on the details of the specific implementation.

Figure 6:
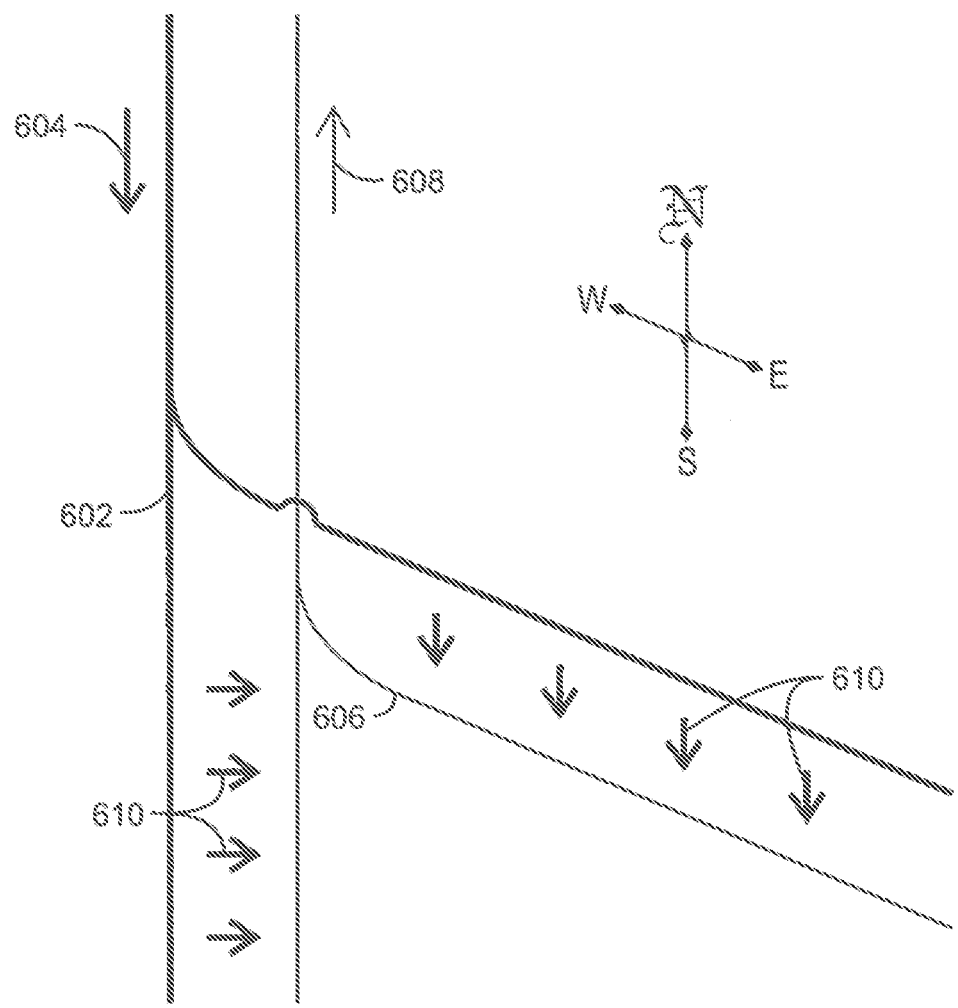
FIG. 6 is a perspective view of a pipeline configuration for recovering methane from a methane hydrate formation.

FIG. 6 is a perspective view of a pipeline configuration 600 for recovering methane from a methane hydrate formation. The pipeline configuration 600 includes an injection pipeline 602 for injecting carbon dioxide and nitrogen into a methane hydrate formation, as indicated by arrow 604. The pipeline configuration 600 also includes a production pipeline 606 for recovering methane from the methane hydrates, as indicated by arrow 608. According to the embodiment shown in FIG. 6, the injection pipeline 602 and the production pipeline 606 run both North to South and East to West.

In some embodiments, injecting the carbon dioxide and the nitrogen into the methane hydrate formation via the injection pipeline 602 causes the methane within the methane hydrate formation to be released. The released methane then moves in the direction of the production pipeline 606, as indicated by arrow 610, and is recovered via the production pipeline 606.

Figure 7:
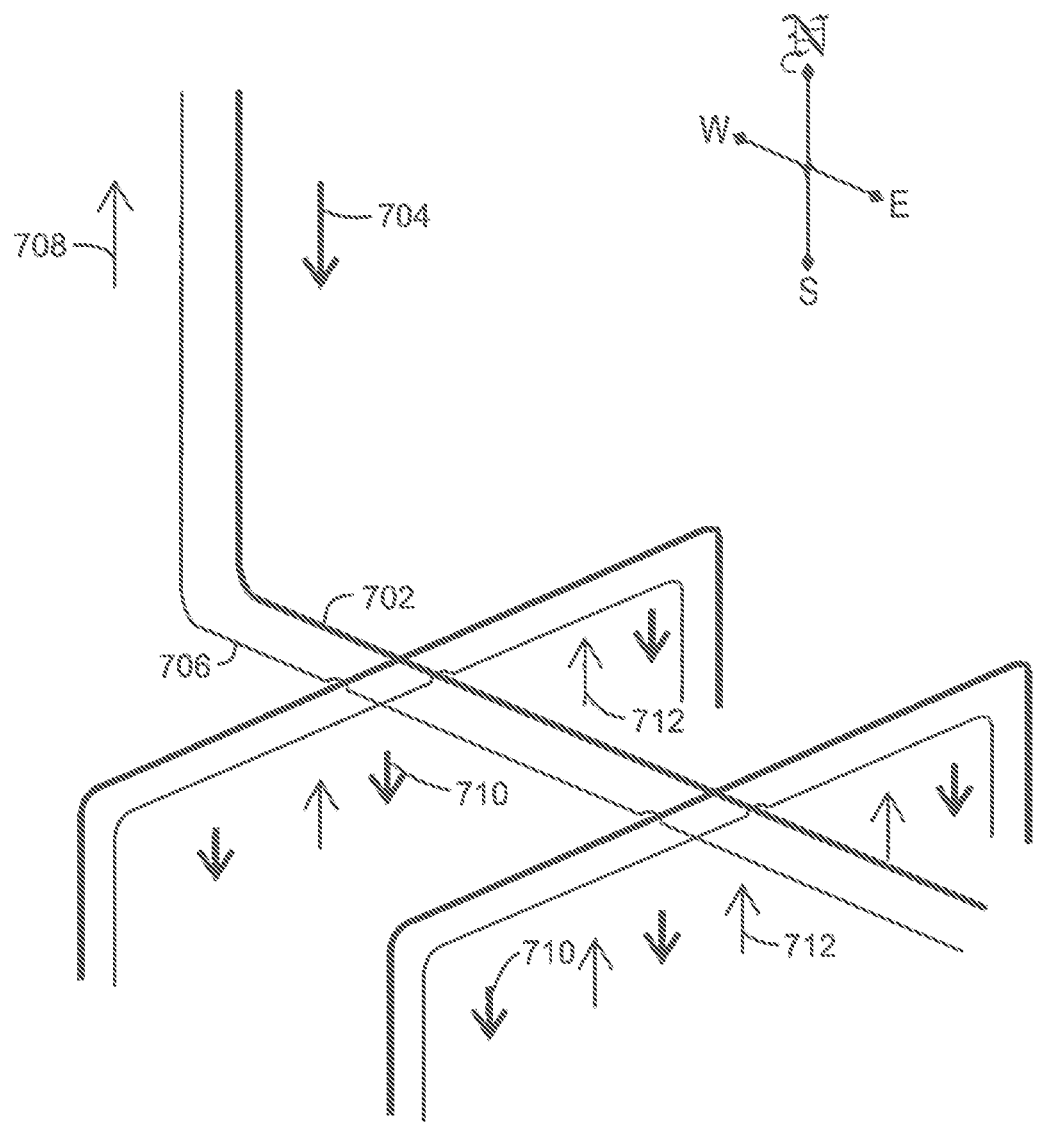
FIG. 7 is a perspective view of another pipeline configuration for recovering methane from a methane hydrate formation.

FIG. 7 is a perspective view of another pipeline configuration 700 for recovering methane from a methane hydrate formation. The pipeline configuration 700 includes an injection pipeline 702 for injecting carbon dioxide and nitrogen into a methane hydrate formation, as indicated by arrow 704. The pipeline configuration 700 also includes a production pipeline 706 for recovering methane from the methane hydrates, as indicated by arrow 708. According to the embodiment shown in FIG. 7, the injection pipeline 702 and the production pipeline 706 each include multiple branches running both North to South and East to West.

As the carbon dioxide and the nitrogen are injected into the methane hydrate formation via the injection pipeline 702, the carbon dioxide and the nitrogen may move through the methane hydrate formation, as indicated by arrows 710. This may cause the methane within the methane hydrate formation to be released. The released methane may then move in the direction of the production pipeline 706, as indicated by arrows 712, and be recovered via the production pipeline 706.

The schematics of FIGS. 6 and 7 are not intended to indicate that the pipeline configurations 600 and 700 shown in FIGS. 6 and 7 are the only pipeline configurations that may be used according to embodiments described herein. Rather, any suitable type of pipeline configuration that provides for the distribution of nitrogen and carbon dioxide within a methane hydrate formation and the recovery of methane from the methane hydrate formation may be used according to embodiments described herein. For example, in some embodiments, the pipeline configurations 600 and 700 of FIGS. 6 and 7 each include two injection pipelines 602 and 702 for separately injecting the carbon dioxide and the nitrogen into the methane hydrate formation.

Method for Power Generation and Methane Recovery from Methane Hydrates

Figure 8:
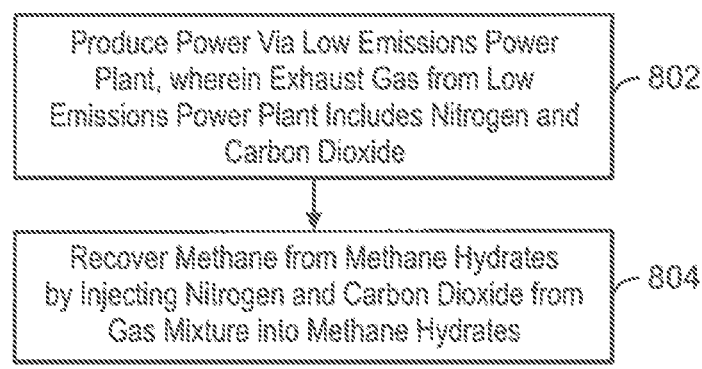
FIG. 8 is a process flow diagram of a method for power generation and methane recovery from methane hydrates.

FIG. 8 is a process flow diagram of a method 800 for power generation and methane recovery from methane hydrates. The method 800 may be implemented by any of the systems 200, 300, or 500 described with respect to FIGS. 2, 3, and 5. Moreover, the method 800 may be implemented by any variation of the systems 200, 300, or 500 described with respect to FIGS. 2, 3, and 5, or any suitable alternative system that is capable of integrating power generation with methane recovery from methane hydrates. Further, the method 800 may be implemented in a permafrost environment including methane hydrate formations, such as the Arctic, sub-Arctic, or Antarctica, for example.

The method 800 begins at block 802, at which power is produced via a low emissions power plant. An exhaust gas from the low emissions power plant provides a gas mixture including nitrogen and carbon dioxide.

In various embodiments, producing power via the low emissions power plant includes providing mechanical energy via an expander turbine of a gas turbine engine using energy extracted from the gas mixture after combustion of the gas mixture in a combustor and generating electricity via a generator using the mechanical energy provided by the expander turbine. Further, in various embodiments, producing power via the low emissions power plant also includes generating steam via a HRSG by heating a boiler with an exhaust stream from the expander turbine, providing mechanical energy via a steam turbine using energy extracted from the steam generated by the HRSG, and generating electricity via a generator using the mechanical energy provided by the steam turbine. In some embodiments, one common generator is used to generate electricity from the mechanical energy provided by the expander turbine and the steam turbine, while, in other embodiments, separate generators are used.

At block 804, methane is recovered from methane hydrates by injecting the nitrogen and the carbon dioxide from the gas mixture into the methane hydrates. In some embodiments, the gas mixture is separated into the carbon dioxide and the nitrogen, and the carbon dioxide and the nitrogen are separately injected into the methane hydrates. In other embodiments, the gas mixture is injected into the methane hydrates without separating the nitrogen from the carbon dioxide within the gas mixture. In some cases, the ratio of the nitrogen to the carbon dioxide within the gas mixture is adjusted prior to injecting the gas mixture into the methane hydrates. For example, a nitrogen mole fraction of the gas mixture may be adjusted, as discussed with respect to FIG. 4.

In some embodiments, at least a portion of the recovered methane is used as fuel for the combustor of the low emissions power plant. Further, in some embodiments, the recovered methane is purified via a separation facility to remove any impurities that were recovered from the methane hydrates along with the methane. Such impurities may include water from the methane hydrates or soil from the surrounding permafrost, for example.

The process flow diagram of FIG. 8 is not intended to indicate that the steps of the method 800 are to be executed in any particular order, or that all of the steps of the method 800 are to be included in every case. Further, any number of additional steps may be included within the method 800, depending on the details of the specific implementation. For example, in some embodiments, the nitrogen and carbon dioxide within the gas mixture are cooled prior to being injected into the methane hydrates. This may prevent the nitrogen and carbon dioxide from melting the methane hydrates upon contact.

Embodiments

Embodiments of the invention may include any combinations of the methods and systems shown in the following numbered paragraphs. This is not to be considered a complete listing of all possible embodiments, as any number of variations can be envisioned from the description herein.

1. A system for generating power and recovering methane from methane hydrates, comprising:
   a low emissions power plant configured to generate power, wherein an exhaust gas from the low emissions power plant provides a gas mixture comprising nitrogen and carbon dioxide; and
   a methane recovery system configured to recover methane from methane hydrates by injecting the nitrogen and the carbon dioxide from the gas mixture into the methane hydrates.
2. The system of paragraph 1, comprising a carbon dioxide separation system configured to separate the carbon dioxide from the nitrogen within the gas mixture.
3. The system of paragraph 2, wherein the methane recovery system is configured to recover the methane from the methane hydrates by separately injecting the carbon dioxide and the nitrogen into the methane hydrates.
4. The system of any of paragraphs 1 or 2, wherein the methane recovery system is configured to recover the methane from the methane hydrates by injecting the gas mixture comprising the carbon dioxide and the nitrogen into the methane hydrates without separating the nitrogen from the carbon dioxide within the gas mixture.
5. The system of any of paragraphs 1, 2, or 4, wherein the methane recovery system is configured to adjust a ratio of the nitrogen to the carbon dioxide within the gas mixture prior to injection of the gas mixture into the methane hydrates.
6. The system of any of paragraphs 1, 2, 4, or 5, wherein the low emissions power plant comprises:
   an expander turbine configured to provide mechanical energy by extracting energy from the gas mixture after combustion of the gas mixture in a combustor; and
   a generator configured to generate electricity from the mechanical energy provided by the expander turbine.
7. The system of paragraph 6, wherein at least a portion of the methane recovered from the methane hydrates is flowed into the combustor as fuel.
8. The system of any of paragraphs 1, 2, or 4-6, wherein the low emissions power plant comprises a combined cycle power plant.
9. The system of paragraph 8, wherein the combined cycle power plant comprises:
   an expander turbine configured to provide mechanical energy by extracting energy from the gas mixture after combustion of the gas mixture in a combustor;
   a heat recovery steam generator (HRSG) configured to generate steam by heating a boiler with an exhaust stream from the expander turbine;
   a steam turbine configured to provide mechanical energy by extracting energy from the steam generated by the HRSG; and
   a generator configured to generate electricity from the mechanical energy provided by the expander turbine and the steam turbine.
10. The system of paragraph 9, wherein at least a portion of the methane recovered from the methane hydrates is flowed into the combustor as fuel.
11. The system of any of paragraphs 1, 2, 4-6, or 8, wherein a portion of the gas mixture is recycled to the low emissions power plant.
12. The system of any of paragraphs 1, 2, 4-6, 8, or 11, comprising a cooler for cooling the gas mixture prior to injection of the carbon dioxide and the nitrogen from the gas mixture into the methane hydrates.
13. The system of any of paragraphs 1, 2, 4-6, 8, 11, or 12, wherein the low emissions power plant is configured to operate at a substantially stoichiometrically balanced condition, and wherein at least a portion of the exhaust gas is recirculated to the low emissions power plant.
14. A method for generating power and recovering methane from methane hydrates, comprising:
   producing power via a low emissions power plant, wherein an exhaust gas from the low emissions power plant provides a gas mixture comprising nitrogen and carbon dioxide; and
   recovering methane from methane hydrates by injecting the nitrogen and the carbon dioxide from the gas mixture into the methane hydrates.
15. The method of paragraph 14, comprising:
   separating the gas mixture into the carbon dioxide and the nitrogen; and
   separately injecting the carbon dioxide and the nitrogen into the methane hydrates.
16. The method of any of paragraphs 14 or 15, comprising injecting the gas mixture into the methane hydrates without separating the nitrogen from the carbon dioxide within the gas mixture.
17. The method of paragraph 16, comprising adjusting a ratio of the nitrogen to the carbon dioxide within the gas mixture prior to injecting the gas mixture into the methane hydrates.

18. The method of any of paragraphs 14-16, wherein producing the power via the low emissions power plant comprises:
   providing mechanical energy via an expander turbine using energy extracted from the gas mixture after combustion of the gas mixture in a combustor; and
   generating electricity via a generator using the mechanical energy provided by the expander turbine.
19. The method of paragraph 18, comprising flowing at least a portion of the methane recovered from the methane hydrates into the combustor as fuel.
20. The method of any of paragraphs 14-16 or 18, wherein producing the power via the low emissions power plant comprises:
   providing mechanical energy via an expander turbine using energy extracted from the gas mixture after combustion of the gas mixture in a combustor;
   generating steam via a heat recovery steam generator (HRSG) by heating a boiler with an exhaust stream from the expander turbine;
   providing mechanical energy via a steam turbine using energy extracted from the steam generated by the HRSG; and
   generating electricity via a generator using the mechanical energy provided by the expander turbine and the steam turbine.
21. The method of paragraph 20, comprising flowing at least a portion of the methane recovered from the methane hydrates into the combustor as fuel.
22. The method of any of paragraphs 14-16, 18, or 20, wherein recovering the methane from the methane hydrates by injecting the nitrogen and the carbon dioxide from the gas mixture into the methane hydrates comprises:
   increasing a temperature of the methane hydrates by contacting the methane hydrates with the nitrogen; and
   dissociating the methane from the methane hydrates by contacting the methane hydrates with the carbon dioxide, wherein the carbon dioxide replaces the methane within the methane hydrates.
23. The method of any of paragraphs 14-16, 18, 20, or 22, comprising removing impurities from the methane recovered from the methane hydrates.
24. A system for recovering methane from methane hydrates using a gas mixture from a combined cycle power plant, comprising:
   an expander turbine configured to provide mechanical energy by extracting energy from a gas mixture exiting a combustor, wherein the gas mixture comprises nitrogen and carbon dioxide;
   a heat recovery steam generator (HRSG) configured to generate steam by heating a boiler with the gas mixture from the expander turbine;
   a steam turbine configured to provide mechanical energy by extracting energy from the steam generated by the HRSG;
   a generator configured to generate electricity from the mechanical energy provided by the expander turbine and the steam turbine;
   a separation system configured to separate the carbon dioxide from the methane within the gas mixture; and
   a methane recovery system configured to recover methane from methane hydrates by injecting the nitrogen and the carbon dioxide from the gas mixture into the methane hydrates, wherein at least a portion of the methane recovered from the methane hydrates is flowed into the combustor as fuel.
25. The system of paragraph 24, wherein the expander turbine is configured to operate at a substantially stoichiometrically balanced condition, and wherein at least a portion of the gas mixture is recirculated to the combustor.

While the present techniques may be susceptible to various modifications and alternative forms, the exemplary embodiments discussed herein have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:
1. A system for generating power and recovering methane from a methane hydrates formation, comprising:
   a combined cycle power plant configured to generate power, comprising a combustor for combusting a fuel and an oxidant in the presence of a diluent thereby generating an exhaust gas comprising a gas mixture of nitrogen and carbon dioxide, wherein the diluent, the fuel and the oxidant are each separately injected into the combustor and wherein the diluent comprises a recirculated part of the exhaust gas;
   an expander turbine configured to provide mechanical energy by extracting energy from the exhaust gas; and
   a methane recovery system in fluid communication with the methane hydrates formation configured to recover methane from methane hydrates in the methane hydrates formation by injecting the nitrogen and the carbon dioxide from the gas mixture into the methane hydrates.
2. The system of claim 1, comprising a carbon dioxide separation system configured to separate the carbon dioxide from the nitrogen within the gas mixture.
3. The system of claim 2, wherein the methane recovery system is configured to recover the methane from the methane hydrates by separately injecting the carbon dioxide and the nitrogen into the methane hydrates.
4. The system of claim 1, wherein the methane recovery system is configured to recover the methane from the methane hydrates by injecting the gas mixture comprising the carbon dioxide and the nitrogen into the methane hydrates without separating the nitrogen from the carbon dioxide within the gas mixture.
5. The system of claim 1, wherein the methane recovery system is configured to adjust a ratio of the nitrogen to the carbon dioxide within the gas mixture prior to injection of the gas mixture into the methane hydrates.
6. The system of claim 1, wherein the combined cycle power plant comprises:
   a generator configured to generate electricity from the mechanical energy provided by the expander turbine.
7. The system of claim 6, wherein at least a portion of the methane recovered from the methane hydrates is flowed into the combustor as fuel.
8. The system of claim 1, wherein the combined cycle power plant comprises:
   a heat recovery steam generator (HRSG) configured to generate steam by heating a boiler with an exhaust stream from the expander turbine;
   a steam turbine configured to provide mechanical energy by extracting energy from the steam generated by the HRSG; and
   a generator configured to generate electricity from the mechanical energy provided by the expander turbine and the steam turbine.

9. The system of claim 8, wherein at least a portion of the methane recovered from the methane hydrates is flowed into the combustor as fuel.

10. The system of claim 1, comprising a cooler for cooling the gas mixture prior to injection of the carbon dioxide and the nitrogen from the gas mixture into the methane hydrates.

11. The system of claim 1, wherein the combined cycle power plant is configured to operate at a substantially stoichiometrically balanced condition.

12. A method for generating power and recovering methane from a methane hydrates formation, comprising:
producing power via a combined cycle power plant comprising a combustor;
separately injecting a diluent, a fuel and an oxidant into the combustor;
combusting a fuel and an oxidant in the presence of a diluent thereby generating an exhaust gas comprising a gas mixture of nitrogen and carbon dioxide, wherein the diluent comprises a recirculated part of the exhaust gas, and wherein the exhaust gas provides a gas mixture comprising nitrogen and carbon dioxide; and
extracting energy from the exhaust gas by an expander turbine configured to provide mechanical energy; and
recovering methane from methane hydrates by injecting the nitrogen and the carbon dioxide from the gas mixture into the methane hydrates formation.

13. The method of claim 12, comprising:
separating the gas mixture into the carbon dioxide and the nitrogen; and
separately injecting the carbon dioxide and the nitrogen into the methane hydrates.

14. The method of claim 12, comprising injecting the gas mixture into the methane hydrates without separating the nitrogen from the carbon dioxide within the gas mixture.

15. The method of claim 14, comprising adjusting a ratio of the nitrogen to the carbon dioxide within the gas mixture prior to injecting the gas mixture into the methane hydrates.

16. The method of claim 12, wherein producing the power via the combined cycle power plant comprises:
providing mechanical energy via an expander turbine using energy extracted from the gas mixture after combustion of the gas mixture in a combustor; and
generating electricity via a generator using the mechanical energy provided by the expander turbine.

17. The method of claim 16, comprising flowing at least a portion of the methane recovered from the methane hydrates into the combustor as fuel.

18. The method of claim 12, wherein producing the power via the combined cycle power plant comprises:
providing mechanical energy via an expander turbine using energy extracted from the gas mixture after combustion of the gas mixture in a combustor;
generating steam via a heat recovery steam generator (HRSG) by heating a boiler with an exhaust stream from the expander turbine;
providing mechanical energy via a steam turbine using energy extracted from the steam generated by the HRSG; and
generating electricity via a generator using the mechanical energy provided by the expander turbine and the steam turbine.

19. The method of claim 18, comprising flowing at least a portion of the methane recovered from the methane hydrates into the combustor as fuel.

20. The method of claim 12, wherein recovering the methane from the methane hydrates by injecting the nitrogen and the carbon dioxide from the gas mixture into the methane hydrates comprises:
increasing a temperature of the methane hydrates by contacting the methane hydrates with the nitrogen; and
dissociating the methane from the methane hydrates by contacting the methane hydrates with the carbon dioxide, wherein the carbon dioxide replaces the methane within the methane hydrates.

21. The method of claim 12, comprising removing impurities from the methane recovered from the methane hydrates.

22. A system for recovering methane from methane hydrates using a gas mixture from a combined cycle power plant, comprising:
a combustor for combusting a fuel and an oxidant in the presence of a diluent thereby generating an exhaust gas comprising a gas mixture of nitrogen and carbon dioxide, wherein the diluent, the fuel and the oxidant are each separately injected into the combustor and wherein the diluent comprises a recirculated part of the exhaust gas;
an expander turbine configured to provide mechanical energy by extracting energy from the gas mixture exiting the combustor;
a heat recovery steam generator (HRSG) configured to generate steam by heating a boiler with the gas mixture from the expander turbine;
a steam turbine configured to provide mechanical energy by extracting energy from the steam generated by the HRSG;
a generator configured to generate electricity from the mechanical energy provided by the expander turbine and the steam turbine;
a separation system configured to separate the carbon dioxide from the methane within the gas mixture; and
a methane recovery system in fluid communication with a methane hydrates formation containing methane hydrates, wherein the methane recovery system is configured to recover methane from methane hydrates by injecting the nitrogen and the carbon dioxide from the gas mixture into the methane hydrates, wherein at least a portion of the methane recovered from the methane hydrates is flowed into the combustor as at least a portion of the fuel.

23. The system of claim 22, wherein the expander turbine is configured to operate at a substantially stoichiometrically balanced condition, and wherein at least a portion of the gas mixture is recirculated to the combustor.

* * * * *